United States Patent
Tsutsumi et al.

(10) Patent No.: US 9,590,262 B2
(45) Date of Patent: Mar. 7, 2017

(54) REVERSIBLE FUEL CELL AND REVERSIBLE FUEL CELL SYSTEM

(71) Applicants: THE UNIVERSITY OF TOKYO, Tokyo (JP); Exergy Power Systems, Inc., Tokyo (JP)

(72) Inventors: Atsushi Tsutsumi, Tokyo (JP); Kaduo Tsutsumi, Tokyo (JP)

(73) Assignees: THE UNIVERSITY OF TOKYO, Tokyo (JP); EXERGY POWER SYSTEMS, INC., Tokyo (JP)

( * ) Notice: Subject to any disclaimer, the term of this patent is extended or adjusted under 35 U.S.C. 154(b) by 382 days.

(21) Appl. No.: 14/348,666

(22) PCT Filed: Dec. 18, 2012

(86) PCT No.: PCT/JP2012/082849
§ 371 (c)(1),
(2) Date: Mar. 31, 2014

(87) PCT Pub. No.: WO2013/145468
PCT Pub. Date: Oct. 3, 2013

(65) Prior Publication Data
US 2014/0234734 A1 Aug. 21, 2014

(30) Foreign Application Priority Data
Mar. 30, 2012 (JP) .................. 2012-083294

(51) Int. Cl.
*H01M 16/00* (2006.01)
*H01M 8/18* (2006.01)
(Continued)

(52) U.S. Cl.
CPC ............. *H01M 8/186* (2013.01); *H01M 4/24* (2013.01); *H01M 4/9016* (2013.01);
(Continued)

(58) Field of Classification Search
None
See application file for complete search history.

(56) References Cited

U.S. PATENT DOCUMENTS 3,507,704 A * 4/1970 Findl ...................... C25B 9/206
  429/418
6,030,718 A * 2/2000 Fuglevand .......... H01M 8/0247
  429/410
(Continued)

FOREIGN PATENT DOCUMENTS

CN    201608237       10/2010
CN    201608237 U     10/2010
(Continued)

OTHER PUBLICATIONS

Office Action dated Mar. 30, 2016, issued in couterpart Korean Patent Application No. 10-2014-7023542. (6 pages).
(Continued)

*Primary Examiner* — Maria J Laios
(74) *Attorney, Agent, or Firm* — Westerman, Hattori, Daniels & Adrian, LLP

(57) ABSTRACT

A reversible fuel cell includes a positive electrode containing manganese dioxide, a negative electrode containing a hydrogen storage material, a separator disposed between the positive electrode and the negative electrode, and an electrolyte. Each of the negative electrode and the positive electrode is an electrode for power generation and is also an electrode that applies electrolysis to the electrolyte using electric current to be fed from the outside. This cell is capable of storing electric energy to be supplied at the time of overcharge by converting the electric energy into gas, and is also capable of reconverting the gas into electric energy in order to utilize the electric energy. Accordingly, there are provided a reversible fuel cell and a reversible fuel cell
(Continued)

system each of which is excellent in energy utilization efficiency, energy density and load following capability.

19 Claims, 23 Drawing Sheets

(51) Int. Cl.
- *H01M 4/24* (2006.01)
- *H01M 4/90* (2006.01)
- *H01M 10/34* (2006.01)
- *H01M 12/08* (2006.01)
- H01M 8/04 (2016.01)
- H01M 4/86 (2006.01)

(52) U.S. Cl.
CPC ......... *H01M 10/345* (2013.01); *H01M 12/08* (2013.01); *H01M 4/242* (2013.01); *H01M 8/04208* (2013.01); *H01M 16/003* (2013.01); *H01M 2004/8689* (2013.01); *H01M 2250/20* (2013.01); *Y02E 60/124* (2013.01); *Y02E 60/128* (2013.01); *Y02T 90/32* (2013.01)

(56) References Cited

U.S. PATENT DOCUMENTS 6,916,577 B2 * 7/2005 Parent ................ H01M 2/1653
429/206

2007/0295734 A1 * 12/2007 Nakajima ............. F16L 59/065
220/592.22

FOREIGN PATENT DOCUMENTS

| JP | 2010-15783 | 1/2010 |
|----|------------|--------|
| JP | 2010-015783 A | 1/2010 |

OTHER PUBLICATIONS

International Search Report dated Jan. 22, 2013 issued in International PCT Patent Application No. PCT/JP2012/082849.
Chinese Office Action dated Nov. 4, 2015 issued in Chinese Patent Application No. 201280069648.3.
Choi, Bokkyu et al., "Development of Fuel Cell/Battery (FCB) System: Integration of Power Generation and Energy Storage System", The Japan Institute of Energy Taikai Koen Yoshishu, Aug. 2, 2010, vol. 19, pp. 260 and 261.
Choi, Bokkyu et al., "Nenryo Denchi to Niji Denchi o Ittaika shita Fuel Cell/Battery (FCB) System no Cathode no Kaihatsu", Abstracts, Battery Symposium in Japan, Nov. 8, 2010, vol. 51, p. 320.
Choi, Bokkyu et al., "Development of NiMH-based Fuel Cell/Battery (FCB) System: Characterization of $Ni(OH)_2/MnO_2$ positive electrode for FCB", Journal of Power Sources, Dec. 1, 2009, vol. 194, No. 2, pp. 1150-1155.
Choi, Bokkyu et al., "Rapid hydrogen charging on metal hydride negative electrode of Fuel Cell/Battery (FCB) Systems", International Journal of Hydrogen Energy, 2009, vol. 34, p. 2058-2061.

* cited by examiner

REVERSIBLE FUEL CELL AND REVERSIBLE FUEL CELL SYSTEM

TECHNICAL FIELD

The present invention relates to a reversible fuel cell capable of storing electric energy at the time of charge as chemical energy and utilizing the stored chemical energy by reconversion to electric energy. The present invention also relates to a reversible fuel cell system, a reversible fuel cell module and a reversible fuel cell bank each including the reversible fuel cell.

BACKGROUND ART

Secondary batteries and fuel cells are high-efficient, clean energy sources. In recent years, electric vehicles, fuel cell vehicles and trains equipped with such secondary batteries and fuel cells as power supplies have been under development on a worldwide basis.

Attention has been given to a fuel cell as a power supply having high energy conversion efficiency and a small environmental load. A fuel cell is incapable of accumulating electric power. However, it is possible to construct a certain power storage system by combining a fuel cell with, for example, a hydrogen producing apparatus for producing hydrogen by electrolysis of water. Such a power storage system is called a reversible fuel cell (refer to Patent Literature 1 and Patent Literature 2). The reversible fuel cell constructed by combining the fuel cell with the water electrolyzer performs water electrolysis, which is a reverse reaction of power generation, using natural energy or night-time electric power, during the reversible fuel cell is not generating electric power. Thus, this power generation system produces fuel for its own use.

On the other hand, a secondary battery has been used as a power supply for an electric or electronic device requiring large current discharge, such as an electric tool. In recent years, particularly, attention has been given to a nickel-metal hydride secondary battery and a lithium-ion secondary battery as a battery for a hybrid vehicle to be driven by an engine and the battery.

A typical secondary battery is charged with electric energy, thereby storing electricity. Patent Literature 3 discloses a secondary battery which is rechargeable with gas. Moreover, Patent Literature 4 discloses a new type fuel cell which is a combination of a fuel cell and a secondary battery and contains manganese hydroxide as a positive electrode active material and a hydrogen storage alloy as a negative electrode active material.

CITATION LIST

Patent Literature

Patent Literature 1: JP 2002-348694 A
Patent Literature 2: JP 2005-65398 A
Patent Literature 3: JP 2010-15729 A
Patent Literature 4: JP 2010-15783 A

SUMMARY OF INVENTION

Technical Problem

A secondary battery is capable of storing electric power. However, an amount of a negative electrode active material and an amount of a positive electrode active material depend on the volume of a battery. Therefore, the electric capacity of the battery is limited. Moreover, it is difficult to considerably enhance the energy density of the secondary battery.

On the other hand, a fuel cell generates (discharges) electric power using hydrogen gas or oxygen gas to be supplied from the outside. Unlike a secondary battery, therefore, a fuel cell has no problem about a limitation on the energy density. In order to use a fuel cell, typically, there is a necessity to provide apparatuses or members for supplying hydrogen gas and oxygen gas to electrode portions. Moreover, a fuel cell is inferior to a secondary battery in a capability to follow a load change. Therefore, it is difficult to use a fuel cell solely as a power supply for an apparatus requiring a large load change, such as a vehicle.

Further, gas to be produced by a hydrogen producing apparatus (refer to, for example, Patent Literature 1) is hydroxygen gas in which a ratio between hydrogen and oxygen is 2:1. Therefore, there is a necessity to ensure safety with care.

A "fuel cell battery" disclosed in Patent Literature 4 contains manganese hydroxide as a positive electrode active material. Therefore, trimanganese tetraoxide which does not contribute to charge and discharge reactions is generated by repetitions of charge and discharge. Accordingly, this fuel cell has a problem of poor lifetime characteristic.

A zinc-manganese primary battery has been widely known as an aqueous solution-based battery including a positive electrode made of manganese dioxide. A zinc-manganese battery is used as a primary battery exclusively, and is not used as a secondary battery. The reasons therefore are mentioned below. In a positive electrode of a manganese battery, manganese dioxide $MnO_2$ is changed to manganese oxyhydroxide MnOOH, and then is changed to manganese hydroxide $Mn(OH)_2$ in the course of discharge. Herein, when the discharge is continued until manganese hydroxide is generated, trimanganese tetraoxide $Mn_3O_4$ is disadvantageously generated to inhibit recharge of the positive electrode. In other words, there is a problem in that an irreversible substance to be generated in the positive electrode, i.e., trimanganese tetraoxide increases by repetitions of discharge (manganese oxyhydroxide→manganese hydroxide) and charge (manganese hydroxide→manganese oxyhydroxide).

Trimanganese tetraoxide has a characteristic of low electric conductivity. The low electric conductivity causes the following disadvantage. That is, it becomes difficult for the battery to be charged satisfactorily because it takes much time for the charge. Moreover, the battery which is low in electric conductivity also becomes poor in charge efficiency. Accordingly, when trimanganese tetraoxide increases, a fuel cell is degraded in performance, and finally becomes unusable. For these reasons, manganese dioxide is used for a primary battery exclusively, but is not used as a positive electrode active material for a secondary battery as of now.

The present invention has been devised in consideration of the respects described above, and an object thereof is to provide a reversible fuel cell which is high in energy density, excellent in load following capability and also excellent in lifetime characteristic.

Solution to Problem

In order to solve the problems described above, the inventors have made studies eagerly and completed a reversible fuel cell according to the present invention.

The reversible fuel cell according to the present invention (hereinafter, referred to as this fuel cell) includes a positive electrode containing manganese dioxide, a negative electrode containing a hydrogen storage material, a separator disposed between the positive electrode and the negative electrode, an oxygen storage chamber and a hydrogen storage chamber for storing hydrogen generated from the positive electrode and oxygen generated from the negative electrode independently of each other, and an electrolyte. In this fuel cell, the oxygen storage chamber is filled with the electrolyte in which oxygen dissolves.

In this fuel cell, discharge reactions in the negative and positive electrodes may be represented by Formulas (1) and (3), respectively, and charge reactions in the negative and positive electrodes may be represented by Formulas (2) and (4), respectively.

$$MH \rightarrow M + H^+ + e^- \quad (1)$$

$$M + \tfrac{1}{2}H_2 \rightarrow MH \quad (2)$$

$$MnO_2 + H^+ + e^- \rightarrow MnOOH \quad (3)$$

$$MnOOH + O_2 \rightarrow MnO_2 + H_2O \quad (4)$$

In Formulas (1) and (2), M represents a hydrogen storage material.

As shown in Formulas (2) and (4) each representing the charge process of this fuel cell, the negative electrode and the positive electrode are chemically charged with hydrogen and oxygen, respectively.

As shown in Reaction Formulas (3) and (4), the positive electrode active material is repeatedly returned to manganese dioxide and changed to manganese oxyhydroxide during the charge and discharge.

When the discharge is continued until manganese dioxide is changed to manganese hydroxide, trimanganese tetraoxide is disadvantageously generated. Hence, the inventors have considered as follows. That is, if the discharge is not continued until manganese dioxide is changed to manganese hydroxide, trimanganese tetraoxide is not generated, so that the positive electrode is not degraded. Moreover, the inventors have demonstrated this consideration by experiment. This experiment is described below.

The inventors examined by experiment the transition of a charge and discharge cycle characteristic of manganese dioxide responsive to the depth of a discharge reaction. FIGS. 13A and 13B illustrate the results of experiment. In FIGS. 13A and 13B, the vertical axis indicates a potential of an electrode, and the horizontal axis indicates a discharge amount. Discharge curves illustrated in FIG. 13A are obtained when charge and discharge in a one-electron reaction are repeated 30 times. Discharge curves illustrated in FIG. 13B are obtained when charge and discharge in a two-electron reaction are repeated 30 times. As illustrated in FIG. 13A, the discharge curves hardly differ from one another even when the charge and discharge are repeated. As illustrated in FIG. 13B, on the other hand, the discharge amount decreases as the charge and discharge are repeated. Herein, the one-electron reaction refers a discharge reaction in which manganese dioxide is changed to manganese oxyhydroxide. The two-electron reaction refers a discharge reaction in which manganese dioxide is changed to manganese oxyhydroxide, and then is changed to manganese hydroxide. It is apparent from the results of experiment illustrated in FIGS. 13A and 13B that a discharge characteristic almost homogeneously remains as long as the discharge reaction is the one-electron reaction. It is also apparent that when the two-electron reaction occurs, the discharge characteristic is gradually deteriorated as the charge and discharge are repeated. Thus, it is apparent that the electrode is gradually degraded.

In order to pursue the cause of this degradation, the inventors conducted XRD measurement on the electrode after charge and discharge. FIG. 14 illustrates results of this measurement. As illustrated in a graph (a) of FIG. 14, when charge and discharge are repeated in the one-electron reaction, a new peak is hardly found except a peak corresponding to a crystal structure of the electrode before experiment. For comparison, a graph (s) of FIG. 14 illustrates results of the measurement conducted on the electrode before experiment. As illustrated in a graph (b) of FIG. 14, however, when charge and discharge are repeated in the two-electron reaction, a characteristic peak derived from manganese dioxide is hardly found, but a peak derived from trimanganese tetraoxide is found. It is apparent from this result that it is possible to restrain the generation of trimanganese tetraoxide by stopping the discharge in the stage where manganese dioxide is changed to manganese oxyhydroxide.

Even when manganese dioxide is subjected to hydroxylation by the discharge, the contact of the electrode with oxygen allows return to manganese dioxide. Thus, manganese dioxide is not changed to manganese hydroxide, so that irreversible trimanganese tetraoxide is not generated. That is, the inventors have succeeded in using manganese dioxide as a material for the positive electrode in such a manner that the positive electrode is charged by contacting with oxygen in the stage of hydroxylation of manganese dioxide.

FIGS. 15A and 15B illustrate results of experiment indicating that the positive electrode can be charged while being brought into contact with oxygen gas.

As illustrated in FIGS. 15A and 15B, with regard to a half battery configured with a positive electrode made of manganese oxyhydroxide, a reference electrode made of silver (Ag), and an alkaline electrolyte, a change of a potential at the positive electrode at the time when charge and discharge are performed with pressurized oxygen gas supplied to the battery is plotted relative to a time. In FIGS. 15A and 15B, the vertical axis indicates the potential (V vs. Ag/AgCl) of the positive electrode, and the horizontal axis indicates the elapsed time (minute). In the half battery including the positive electrode made of manganese dioxide and the reference electrode made of silver, a cutoff potential at the time when manganese dioxide in the positive electrode is changed to manganese oxyhydroxide by discharge is −0.5V. It is apparent from FIGS. 15A and 15B that manganese dioxide in the positive electrode is changed to manganese oxyhydroxide because the potential at the positive electrode is −0.5V before charge (at a point in time zero).

In FIG. 15A, (i) indicates a graph illustrating a potential at the reference electrode after pressurized oxygen gas is supplied to the positive electrode. In FIG. 15A, (ii) indicates a graph in an instance where the supply of oxygen gas is stopped and then discharge is performed at 0.2 C. As illustrated in FIG. 15A, in an instance where the positive electrode is brought into contact with oxygen gas (a solid line), the positive electrode is almost fully charged after a lapse of 60 minutes, and thereafter is discharged at 0.2 C. On the other hand, in an instance where the positive electrode is not brought into contact with oxygen gas (a dotted line), the positive electrode is hardly charged. Thus, it was confirmed that a fuel cell cathode reaction (oxidation-reduction reaction) occurs by oxygen gas and that discharge by a secondary battery reaction occurs after the interruption of oxygen gas. FIG. 15B illustrates a state of charge using oxygen gas, in the discharged state at 0.2 C. It is apparent from this figure that charge using oxygen gas can be performed even during discharge. It was confirmed from the results of experiment illustrated in FIGS. 15A and 15B that the positive electrode can be charged by the supply of oxygen gas to the positive electrode.

In the fuel cell according to the present invention, an amount of oxygen dissolving in the electrolyte is 0.02 to 24 g/L. In the fuel cell according to the present invention, moreover, a pressure of the electrolyte is 0.2 MPa to 278 MPa.

When the pressure of the electrolyte is not more than 0.2 MPa, the positive electrode can not be satisfactorily charged with oxygen dissolving in the electrolyte. Moreover, when the pressure of the electrolyte is not less than 278 MPa, separation into oxygen and hydrogen by electrolysis is hard to occur. Preferably, the pressure of the electrolyte is 0.95 MPa to 100 MPa. When the pressure is not more than 1 MPa, the fuel cell can be easily handled because there is no necessity to use a high-pressure vessel. When the pressure is not less than 100 MPa, the main body of the fuel cell must be configured with an ultrahigh-pressure vessel. Preferably, the amount of oxygen dissolving in the electrolyte is 0.08 to 8.6 g/L.

According to this configuration, manganese dioxide in the positive electrode is temporarily changed to manganese oxyhydroxide by discharge. However, the positive electrode is charged with oxygen dissolving in the electrolyte, so that manganese oxyhydroxide is returned to manganese dioxide. Accordingly, the positive electrode is not discharged to such a degree that manganese dioxide changed to manganese oxyhydroxide is further changed to a different substance. By charge and discharge, the active material of the positive electrode is changed between manganese dioxide and manganese oxyhydroxide. Therefore, trimanganese tetraoxide which does not contribute to charge and discharge is not generated. Moreover, since trimanganese tetraoxide is not generated, the reduction in electric conductivity is also restrained.

In the fuel cell according to the present invention, each of the positive electrode and the negative electrode is an electrode for power generation and is also an electrode for electrolysis of the electrolyte using electric current fed from the outside.

According to this configuration, each of the positive electrode and the negative electrode contains an active material. Therefore, this fuel cell serves as a battery. In other words, this fuel cell can generate electric power without supply of gas and can be charged with electric current. In this fuel cell, when electric current is further fed to this fuel cell in the fully charged state, the electrolyte undergoes water-splitting. Thus, hydrogen and oxygen are generated from the respective electrodes.

According to this configuration, when the electrodes in the fully charged state are further charged with electric current, hydrogen is generated from the active material of the negative electrode by the electrolysis of water (hereinafter, simply referred to as electrolysis). This hydrogen can be stored in the hydrogen storage chamber. Moreover, oxygen generated from the positive electrode dissolves in the electrolyte. Therefore, this oxygen can be stored as the oxygen-dissolved electrolyte in the oxygen storage chamber. Moreover, the positive electrode and the negative electrode serve as not only electrodes for generating electric power using oxygen and hydrogen as fuel, respectively, but also electrodes for water-splitting. Moreover, hydrogen and oxygen generated from the negative electrode and the positive electrode by electrolysis can be stored in the respective storage chambers independently of each other without contact and reaction therebetween.

Hydrogen stored in the hydrogen storage chamber and oxygen stored in the oxygen storage chamber can be utilized by reconversion into electric energy at the time of discharge of the cell. Particularly, oxygen generated from the positive electrode dissolves in the electrolyte and is not stored in a gaseous state. This improves safety about the handling of oxygen. At the time of discharge, the cell serves as a secondary battery, so that electric energy can be extracted therefrom. This allows rapid discharge and also allows improvement in load following capability.

As described above, an electric capacity of a secondary battery depends on an amount of an active material contained in an electrode. Therefore, it is difficult to enhance an energy density of the secondary battery. According to this fuel cell, however, available electric energy can be stored as chemical energy in each storage chamber.

As the result, it becomes possible to increase an amount of chemical energy to be stored per volume and to improve a volume energy density of the fuel cell by enhancing the pressure-resistant performance and sealing performance of each storage chamber and the cell including the storage chambers.

Each of the oxygen storage chamber and hydrogen storage chamber configured as described above is not necessarily a dedicated independent space. These storage chambers may be provided in a clearance formed in, for example, a mixture of the active materials of the positive or negative electrode, or may be provided in a clearance formed in the cell.

In this fuel cell, the oxygen storage chamber and the hydrogen storage chamber may be separated from each other by a movable member or a flexible member.

According to this configuration, the oxygen storage chamber and the hydrogen storage chamber may be provided to adjoin each other. The two chambers are partitioned by the movable member. Therefore, when a pressure in the hydrogen storage chamber rises because of hydrogen gas generated by overcharge, the movable member becomes deformed under an influence of the pressure. Because of this deformation, the electrolyte in the oxygen storage chamber is compressed, and the pressure of the electrolyte and the pressure in the hydrogen storage chamber are equalized, so that the pressure of the electrolyte is increased. A volumetric elastic coefficient of liquid is considerably higher than that of gas. Therefore, the movable member becomes deformed very slightly. The movable member may be a flexible member or may contain an elastic material. The movable member may have a sheet or film structure. Further, the movable member may be the positive electrode or the negative electrode. The movable member may be a film made of rubber or synthetic resin such as polypropylene, or may be a film made of thin metal.

A communication passage may be provided between the oxygen storage chamber and the hydrogen storage chamber. In this instance, a pressure in the hydrogen storage chamber may be transferred to the electrolyte in the oxygen storage chamber through a movable member on the communication passage. In this instance, the movable member may be a piston. Moreover, this fuel cell may be separated by a flexible member. Further, the flexible member may be the positive electrode, the negative electrode and the separator.

In this fuel cell, preferably, in a tubular case, the negative electrode formed into a tube shape is disposed with a radial space interposed between the negative electrode and the tubular case, the positive electrode formed into a tube shape is disposed inside the negative electrode with the separator interposed between the positive electrode and the negative electrode, the hydrogen storage chamber is formed in the radial space, and the oxygen storage chamber is formed inward the positive electrode, or in a tubular case, the positive electrode formed into a tube shape is disposed with a radial space interposed between the positive electrode and the tubular case, the negative electrode formed into a tube shape is disposed inside the positive electrode with the separator interposed between the negative electrode and the positive electrode, the oxygen storage chamber is formed in the radial space, and the hydrogen storage chamber is formed inward the negative electrode. In this configuration, the case serves as an outer casing.

This fuel cell further includes a negative electrode terminal provided on one axial end of the case and electrically connected to the negative electrode, a positive electrode terminal provided on the other axial end of the outer casing and electrically connected to the positive electrode, a projection provided on one of the positive electrode terminal and the negative electrode terminal, and a recess provided on the other one of the positive electrode terminal and the negative electrode terminal. Herein, the projection can be fitted into the recess such that two reversible fuel cells are connected in series. In this configuration, the case serves as an outer casing.

A fuel cell module according to the present invention includes a plurality of cell units connected in series. In the fuel cell module, each of the cell units may include a plurality of reversible fuel cells, and a pair of current collector plates provided to be opposed to each other such that the plurality of reversible fuel cells is sandwiched therebetween. The positive electrode terminal is connected to one of the current collector plates and the negative electrode terminal is connected to the other current collector plate, so that the reversible fuel cells may be connected in parallel with the current collector plate.

Preferably, this fuel cell further includes an outer jacket including a tubular body part, and bulging parts provided on openings formed at two ends of the body part to bulge outward the openings and cover the openings, the oxygen storage chambers formed in inward spaces of the bulging parts in the outer jacket, and a tubular current collector housed in the outer jacket in an axial direction and having two ends opened at the oxygen storage chambers. In this fuel cell, the positive electrode is disposed on an outer periphery of the current collector. The separator covers around the positive electrode. The hydrogen storage chamber is formed between the separator and the outer jacket. The negative electrode is filled in the hydrogen storage chamber. The electrolyte is stored in the oxygen storage chambers and can be flown between the oxygen storage chambers through the current collector.

This fuel cell further includes an outer casing including a tubular body part, and a rod-shaped current collector passing through the positive electrode, the negative electrode and the separator. In this fuel cell, the positive electrode, the negative electrode and the separator may be stacked in an axial direction of the body part and are housed in the outer casing. The positive electrode may have a notch to be formed by cutting a part of an outer periphery thereof, and the outer periphery of the positive electrode may be in contact with an inner surface of the body part except the notch. The positive electrode may not be in contact with the current collector. The negative electrode may have a U-shaped section opened in an inner circumferential direction and be in contact with the current collector. A space surrounded with the negative electrode and the current collector may form the hydrogen storage chamber. An outer dimension of the negative electrode may be smaller than an inner dimension of the body part, and an electrolyte reservoir may be provided between the negative electrode and the body part to communicate with the notch. The oxygen storage chamber may include the notch and the electrolyte reservoir.

In this configuration, the outer casing may include a pipe-shaped body part and a lid member for covering an opening of the body part. Alternatively, the outer casing may include a one-end closed cylindrical can and a lid member to be provided on an opening of the cylindrical can.

When the outer casing is formed into the cylindrical shape, the positive electrode is in contact with the outer casing because an outer diameter of the positive electrode is larger than an inner diameter of the body part. Moreover, the positive electrode is not in contact with the current collector because a size of a hole, through which the current collector passes, in the positive electrode is larger than an outer diameter of the current collector. Likewise, the negative electrode is in contact with the current collector because a size of a hole of the negative electrode is smaller than the outer diameter of the current collector.

A reversible fuel cell system according to the present invention includes this fuel cell, and an oxygen storage source and a hydrogen storage source each connected to this fuel cell. In this reversible fuel cell system, the oxygen storage source can supply oxygen dissolving in the electrolyte to the reversible fuel cell, and can store oxygen generated from the reversible fuel cell in a state that the oxygen dissolves in the electrolyte. The hydrogen gas storage source can supply hydrogen gas to the reversible fuel cell and can store hydrogen gas generated from the reversible fuel cell.

A reversible fuel cell system according to the present invention may include this fuel cell, a salt concentration adjusting apparatus connected to this fuel cell to remove water contained in the electrolyte, and an oxygen concentration adjusting apparatus connected to this fuel cell to supply oxygen to the electrolyte, thereby adjusting a dissolved oxygen concentration.

In this fuel cell, the manganese dioxide serves as a catalyst for a charge reaction in the positive electrode, and the hydrogen storage material serves as a catalyst for a charge reaction in the negative electrode.

According to this configuration, at the time of discharge, the negative electrode is charged with hydrogen gas stored in the hydrogen storage chamber and the positive electrode is charged with oxygen stored in the first or second oxygen storage chamber, so that the charge makes up for electricity reduced by the discharge. More specifically, in the negative electrode, protons are emitted from the hydrogen storage alloy (MH) in the charged state as represented by Reaction Formula (1) indicating the discharge reaction. As represented by Reaction Formula (2), then, hydrogen gas makes up for the emitted protons. Thus, the negative electrode is maintained at the charged state.

On the other hand, in the positive electrode, manganese dioxide ($MnO_2$) in the charged state is reduced, so that manganese oxyhydroxide (MnOOH) is generated, as represented by Reaction Formula (3) indicating the discharge reaction. This manganese oxyhydroxide is oxidized with oxygen again as represented by Reaction Formula (4). Thus, the positive electrode is maintained at the charged state. As described above, hydrogen gas and oxygen in the respective storage chambers are consumed.

In other words, as long as hydrogen gas and oxygen are supplied to this fuel cell, this fuel cell can be promptly charged with the hydrogen gas and the oxygen even when electricity is lost at the time of discharge. Accordingly, this fuel cell is almost always maintained at an almost fully charged state. Since the negative electrode is almost always in the storage state by hydrogen gas, the expansion and contraction of the volume of the negative electrode due to the charge and discharge are restrained. As the result, the negative electrode has an excellent lifetime characteristic. Further, even when an amount of the active material is small, the negative electrode has the functions described above. Therefore, it is possible to decrease an amount of the heavy and expensive hydrogen storage alloy. As the result, it becomes possible to achieve the weight reduction and cost reduction of the cell.

In this fuel cell, the positive electrode may contain, in addition to manganese dioxide, higher manganese oxide. Herein, examples of the higher manganese oxide may include $Mn_2O_5$, $Mn_2O_7$ and $MnO_5$. The higher manganese oxide described above is temporarily generated in the positive electrode when the positive electrode is overcharged at the time of water-splitting of the electrolyte.

In this fuel cell, preferably, a content of trimanganese tetraoxide ($Mn_3O_4$) in the positive electrode is not more than 5% by weight relative to a weight of the positive electrode. Trimanganese tetraoxide is not generated as long as hydrogen gas and oxygen are almost always supplied. However, there is a possibility that trimanganese tetraoxide is generated if hydrogen gas or oxygen becomes short temporarily. The amount exceeding 5% by weight may cause a problem. The amount which is not more than 5% by weight is permissible depending on the use of the cell. The weight of the positive electrode to be defined herein excludes the weight of the current collector.

In this fuel cell, the manganese dioxide contained in the positive electrode may be subjected to carbon coating.

Cobalt may be used in electroconductive treatment. However, cobalt is expensive. Typically, carbon is used as an electrically conductive material. However, carbon is oxidized to generate carbon dioxide. Therefore, it is difficult to maintain the electric conductivity. The inside of this fuel cell is under a hydrogen atmosphere. Therefore, carbon is not oxidized, so that the electric conductivity can be maintained.

In this fuel cell, the hydrogen storage material contains a hydrogen storage alloy or at least one kind of metal selected from the group consisting of Sc, Ti, V, Cr, Mn, Fe, Co and Ni. Moreover, in the negative electrode of this fuel cell, a surface being in contact with the separator may contain a hydrophilic material, and a surface being in contact with the hydrogen storage chamber may contain a hydrophobic material.

Advantageous Effect of Invention

The reversible fuel cell according to the present invention is characterized in high energy density, excellent load following capability and excellent lifetime characteristic.

DESCRIPTION OF EMBODIMENT

Figure 1:
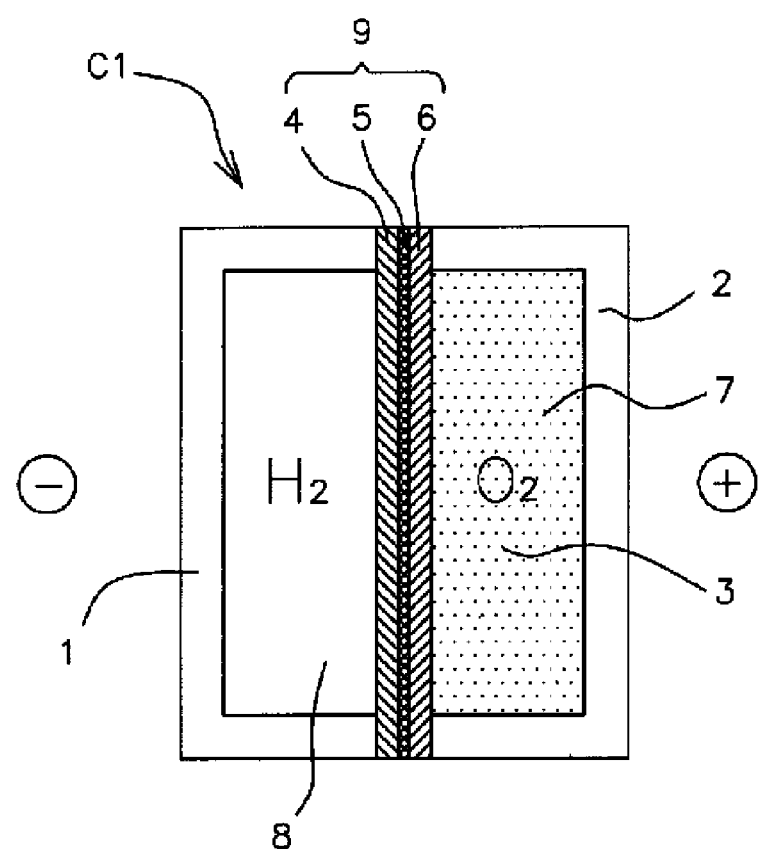
FIG. 1 is a section view schematically illustrating a structure of a reversible fuel cell according to a first embodiment of the invention, which illustrates an example that oxygen dissolves in an electrolyte.

Prior to description of embodiments, first, description will be given of a common electrolyte in these embodiments.
<Electrolyte>

Preferably, an electrolyte to be used in the present invention is an oxygen-dissolved electrolyte corresponding to an electrolyte in which oxygen dissolves within a range from 0.02 to 24 g/L. When a concentration of oxygen dissolving in the electrolyte is less than 0.01 g/L, much time is required for oxidizing a positive electrode active material because of this low oxygen concentration. On the other hand, when the oxygen concentration exceeds 24 g/L, the lifetime of a negative electrode is lowered because the corrosivity of the electrolyte increases. More preferably, the electrolyte is an oxygen-dissolved electrolyte corresponding to an electrolyte in which oxygen dissolves within a range from 0.08 to 8.6 g/L. A dissolved oxygen concentration may be adjusted by increasing a fluid-pressure of the electrolyte. In this instance, preferably, the fluid-pressure of the electrolyte is 0.2 MPa to 278 MPa. More preferably, a pressure of the electrolyte is 0.95 MPa to 100 MPa. The use of the high-pressure or ultrahigh-pressure electrolyte is allowed to increase the dissolved oxygen concentration and to dissolve oxygen to be generated at the time of overcharge in the electrolyte. In addition, the use is also allowed to increase an operating voltage of a cell.

The oxygen-dissolved electrolyte contacts with a positive electrode, thereby oxidizing a positive electrode active material (the positive electrode is charged). When the oxygen-dissolved electrolyte is under high pressure or ultrahigh pressure, oxygen to be generated at the time of charge dissolves in the electrolyte. Thus, the concentration of oxygen dissolving in the electrolyte can be increased.

With regard to the range of the fluid-pressure of the electrolyte, it becomes difficult to increase the concentration of oxygen dissolving in the electrolyte when the fluid-pressure of the electrolyte is less than 0.2 MPa. Therefore, it takes much time to oxidize the positive electrode active material, and it becomes difficult to effectively dissolve oxygen to be generated at the time of charge in the electrolyte. Setting the fluid-pressure of the electrolyte at an ultrahigh pressure exceeding 278 MPa becomes a burden on the structure of the cell.

The electrolyte to be used in the present invention may be a typically used alkaline aqueous solution. From the viewpoint of restraining the elution of an alloy component into the electrolyte, alkaline materials such as lithium hydroxide (LiOH), sodium hydroxide (NaOH) and potassium hydroxide (KOH) may be used solely or in combination. A concentration of the alkaline material in the electrolyte is preferably 1 to 10 mol/L, more preferably 3 to 8 mol/L.

A thickener may dissolve in the electrolyte. The thickener dissolves electrolyte has a high viscosity, and therefore has a low oxygen diffusion rate. By virtue of the low oxygen diffusion rate, since the negative electrode is hard to contact with oxygen, the self-discharge reaction of the negative electrode can be suppressed. Moreover, since the viscosity of the electrolyte becomes higher, the resistance to spill-out is also improved. A material for the thickener may be water-absorbing materials that increase the viscosity of the electrolyte. Examples of the material may include polyacrylate, polystyrenesulfonate, polyvinyl sulfonate, gelatin, starch, polyvinyl alcohol (PVA), and resin such as fluororesin.

Hereinafter, more detailed description will be given of the present invention on the basis of more specific embodiments. However, the present invention is not intended to be limited to these embodiments.

First Embodiment

FIG. 1 is a section view schematically illustrating a structure of a reversible fuel cell C1 (hereinafter, simply referred to as a cell C1) according to a first embodiment, the cell C1 having a basic configuration of a fuel cell. The cell C1 utilizes chemical energy including hydrogen and oxygen by converting the chemical energy into electric energy. Further, the cell C1 is capable of storing the electric energy by converting the electric energy into chemical energy. The cell C1 includes, as main elements, a negative electrode 4, a positive electrode 6, an electrolyte 3, a negative electrode case 1 and a positive electrode case 2. The negative electrode 4 and the positive electrode 6 are opposed to each other with a separator 5 interposed therebetween. The negative electrode case 1 has a hydrogen storage chamber 8. The positive electrode case 2 has an oxygen storage chamber 7.

The negative electrode 4 contains, as a negative electrode active material, a hydrogen storage alloy having composition of $La_{0.54}Pr_{0.18}Nd_{0.18}Mg_{0.1}Ni_{4.5}Al_{0.1}$. The negative electrode 4 is produced as follows. First, a slurry mixture is prepared from acetylene black (AB), carboxymethylcellulose (CMC) and styrene-butadiene rubber in a weight ratio of 97:1:1:1. Further, this slurry mixture is applied onto a perforated metal sheet made of a nickel-plated steel material. The negative electrode 4 has a surface being in contact with the separator 5 and containing a hydrophilic material, and a surface being in contact with the hydrogen storage chamber 8 and containing a hydrophobic material.

The positive electrode 6 contains manganese dioxide as a positive electrode active material. The positive electrode 6 is produced as follows. First, a slurry mixture is prepared from AB, CMC and polytetrafluoroethylene in a weight ratio of 97:0.5:2:0.5. Further, this slurry mixture is filled into a foamed nickel substrate. Herein, the positive electrode active material, i.e., manganese dioxide is loaded into a rotary kiln (at 700° C., for 1 hour, under a butane gas atmosphere) in advance. Thus, an electroconductive thin film is formed on manganese dioxide. A coverage of an electroconductive coating film (carbon-coated film) is obtained by subjecting the resultant manganese dioxide to heat treatment under an oxygen atmosphere and calculating a difference between a weight of the manganese dioxide before the heat treatment and a weight of the manganese dioxide after the heat treatment. The coverage of the carbon-coated film is 0.9% by weight with respect to 100% by weight of manganese dioxide.

The separator 5 includes a microporous film (thickness: 20 μm, mean pore diameter: 0.2 μm) made of polypropylene. The electrolyte 3 is retained in the separator 5.

The electrolyte 3 contains a 6 mol/L aqueous potassium hydroxide solution. The electrolyte 3 further contains 5% by weight of sodium polyacrylate as a thickener. The oxygen storage chamber 19 is filled with the electrolyte 3. Even when a void is formed on the top of the oxygen storage chamber 19, a ratio of the void is at most 5 with respect to the volume of the oxygen storage chamber 19, the volume being defined as 100. In other words, a ratio of the electrolyte 3 filled into the oxygen storage chamber 19 is 95 to 100% with respect to the volume of the oxygen storage chamber 19, the volume being defined as 100%. When the void is large, an amount of oxygen to be effectively stored decreases.

As illustrated in FIG. 1, the separator 5 is sandwiched between the negative electrode 4 and the positive electrode 6. In the negative electrode 4, moreover, the surface which is not in contact with the separator 5 is hermetically covered with the box-shaped negative electrode case 1. An inward space to be formed by the negative electrode 4 and the negative electrode case 1 corresponds to the hydrogen storage chamber 8. The hydrogen storage chamber 8 directly stores hydrogen gas to be generated from the negative electrode, without a necessity to provide an additional member such as a booster. Moreover, the hydrogen storage chamber 8 is provided in contact with the negative electrode 4. Therefore, hydrogen gas can be directly supplied to the negative electrode 4 without a necessity to provide a communication passage or an additional member.

In the positive electrode 6, the surface which is not in contact with the separator 5 is covered with the box-shaped positive electrode case 2. An inward space to be formed by the positive electrode 6 and the positive electrode case 2 corresponds to the oxygen storage chamber 7 for storing oxygen. The oxygen storage chamber 7 stores the electrolyte 3 having a high fluid-pressure (e.g., 10 MPa). Therefore, oxygen to be generated from the positive electrode 6 dissolves in the electrolyte, and is stored as dissolved oxygen in the oxygen storage chamber 7. In other words, oxygen to be generated from the positive electrode 6 is directly stored in the oxygen storage chamber 7, without a necessity to provide an additional member such as a booster. Moreover, the oxygen storage chamber 7 is provided in contact with the positive electrode 6. Therefore, oxygen can be directly supplied to the positive electrode 6, without a necessity to provide a communication passage or an additional member. Preferably, the oxygen storage chamber 7 has an inner surface coated with nickel or chromium. The oxygen storage chamber 7 may have a nickel-plated or chromium-plated inner surface.

The hydrogen storage chamber 8 and the oxygen storage chamber 7 are separated from each other by a movable wall member 9. The wall member 9 includes the positive electrode 4, the negative electrode 6 and the separator 5. The wall member 9 may be a flexible member.

In the negative electrode 4, the surface which is in contact with the hydrogen storage chamber 8 contains the hydrophobic material in a large amount. Thus, the hydrogen storage alloy in the negative electrode 4 can be brought into contact with hydrogen gas without being wetted. In the negative electrode 4, moreover, the surface which is in contact with the separator 5 has a hydrophilic property. Thus, this surface prevents hydrogen gas from passing through the negative electrode 4. This surface is kept at a state that the surface is almost always wetted with the electrolyte. Thus, the ion conductivity of the negative electrode 4 is ensured. Specifically, carbon, Teflon (registered trademark) or the like having a hydrophobic property may be applied onto or sprayed onto the hydrogen storage chamber 8—side surface of the negative electrode 4. Moreover, modified nylon having the hydrophilic property may be applied onto or sprayed onto the surface, which is in contact with the separator 5, of the negative electrode 4'. Further, vinyl acetate having both the hydrophilic property and the hydrophobic property may be granulated and used as a binder.

Hereinafter, description will be given of the configuration of the cell C1. The cell C1 includes the positive electrode 6 containing the positive electrode active material, and the negative electrode 4 containing the negative electrode active material. Therefore, electric energy is stored in the electrodes of the cell C1 at the time of initial charge. In the following, charge exceeding an electric capacity of the active material of the electrode is occasionally referred to as overcharge for the convenience of description. In an overcharge state, oxygen and hydrogen gas are generated.

In the cell C1, when electric current is fed to the electrodes after the initial charge, hydrogen gas is generated from the negative electrode 4 and oxygen is generated from the positive electrode 6. The hydrogen gas is stored in the hydrogen storage chamber 8. When the charge is continued, a pressure in the hydrogen storage chamber 8 rises. Therefore, the hydrogen storage chamber 8 expands under an influence of the hydrogen gas pressure. The hydrogen storage chamber 8 and the oxygen storage chamber 7 are separated from each other by the movable wall member 9. Therefore, when the hydrogen storage chamber 8 expands, the wall member 9 is displaced or becomes deformed, so that the electrolyte 3 in the oxygen storage chamber 7 is compressed. The deformation of the wall member 9 is continued until the pressure in the hydrogen storage chamber 8 and the pressure in the oxygen storage chamber 7 become almost equal to each other. Thus, the electrolyte 3 in the oxygen storage chamber 7 is highly pressurized. As the result, oxygen generated from the positive electrode 6 dissolves in the electrolyte 3. Thereby, the electrolyte 3 is changed to an oxygen-dissolved electrolyte.

In the cell C1 according to this embodiment, the electrolyte 3 has a fluid-pressure of 0.95 MPa. In the cell C1 according to this embodiment, the electrolyte 3 may have a fluid-pressure within a range from 0.2 MPa to 278 MPa.

At the time of discharge of the cell C1, a discharge reaction as a secondary battery occurs between the negative electrode 4 and the positive electrode 6. Thus, electric current is fed into a load. Herein, an amount of electricity in the negative electrode 4 and an amount of electricity in the positive electrode 6 decrease by the discharge. Charge using the hydrogen gas stored in the hydrogen storage chamber 8 and the oxygen stored in the oxygen storage chamber 7 makes up for electricity corresponding to the decreased electricity in the negative electrode 4 and positive electrode 6. That is, the reaction represented by Chemical Formula (2) occurs at the negative electrode 4. As the result, the hydrogen gas makes up for protons emitted from the hydrogen storage alloy (MH) in the charged state. Thus, the negative electrode is maintained at the charged state. On the other hand, the reaction represented by Chemical Formula (4) occurs at the positive electrode 6. As the result, manganese oxyhydroxide generated by the reduction of manganese dioxide ($MnO_2$) in the charged state is oxidized again by the oxygen. Thus, the positive electrode is maintained at the charged state. That is, the manganese dioxide serves as a catalyst for a reaction in the positive electrode. On the other hand, the hydrogen storage alloy serves as a catalyst for a reaction in the negative electrode.

Manganese dioxide in the positive electrode 6 is reduced to manganese oxyhydroxide by discharge. The manganese oxyhydroxide is oxidized by the oxygen in the electrolyte, and thus is returned to manganese dioxide. Accordingly, manganese dioxide almost always exists in the positive electrode 6. Therefore, an SOC (State of Charge) of the positive electrode is maintained at almost 100%. Moreover, the positive electrode 6 faces the oxygen storage chamber 7, and is always in contact with oxygen. With regard to the discharge reaction of manganese dioxide, therefore, manganese dioxide is not changed to manganese hydroxide, so that trimanganese tetraoxide ($Mn_3O_4$) which is an irreversible component is not generated. Accordingly, since the degradation of the positive electrode 6 is restrained, the lifetime characteristic thereof is considerably improved.

The hydrogen storage alloy in the negative electrode 4 emits protons at the time of discharge. Therefore, an amount of hydrogen in the hydrogen storage alloy decreases. However, the negative electrode 4 faces the hydrogen storage chamber 8 and is always in contact with hydrogen gas. Therefore, the hydrogen gas makes up for the protons emitted from the hydrogen storage alloy (MH). As the result, the hydrogen storage alloy, from which hydrogen has been released, stores hydrogen again. Accordingly, the alloy contained in the negative electrode 4 almost always stores hydrogen. As the result, the SOC of the negative electrode is maintained at almost 100%.

Figure 16:
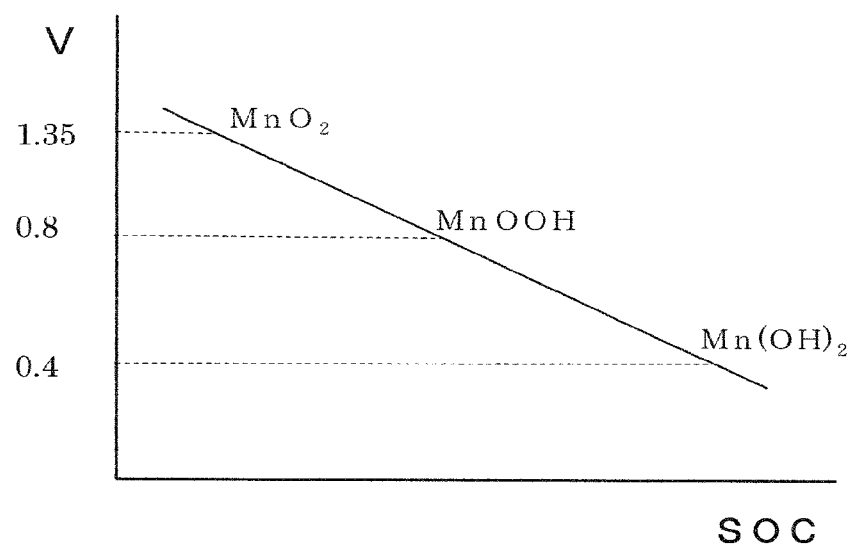
FIG. 16 is a characteristic graph schematically illustrating a relation between composition of a positive electrode and a terminal voltage.

FIG. 16 is a graph schematically illustrating a relation between the potential of the manganese dioxide electrode (vertical axis) and the SOC (horizontal axis). As illustrated in FIG. 16, the potential of the cell C1 is in the vicinity of a high potential represented by manganese dioxide ($MnO_2$). In other words, the discharge potential of the cell C1 is maintained at a high level.

In the cell C1 according to this embodiment, each of the storage chambers 7 and 8 stores, as chemical energy, electric energy to be supplied at the time of overcharge. The cell C1 is capable of utilizing the stored chemical energy by reconverting the chemical energy into electric energy. Unlike a conventional secondary battery, therefore, the electric capacity of the cell C1 has no limitation due to an amount of the active material. Accordingly, it is possible to increase an amount of hydrogen gas to be stored per volume and an amount of dissolved oxygen by enhancing the pressure-resistant performance and sealing performance of the storage chambers 7 and 8 and cell C1. Thus, it is possible to considerably improve the energy density of the cell C1 as compared with that of a conventional secondary battery (for example, up to several tens times). In addition, hydrogen gas generated from the negative electrode 4 is directly stored in the storage chamber 8 and oxygen generated from the positive electrode 6 is directly stored in the storage chamber 7 at the time of overcharge. Therefore, there is no necessity to additionally provide a booster or communication passage for gas. Accordingly, the cell C1 has the simple structure, and therefore can be manufactured and distributed at low costs. Particularly, oxygen is stored in such a manner as to dissolve in the electrolyte. Therefore, safety about the handling of oxygen is drastically improved.

As described above, further, electric energy is output from the cell C1 at the time of discharge by the reactions represented by Formulas (1) and (3). As compared with a conventional fuel cell, therefore, the cell C1 is considerably improved in power and following capability relative to a load. Thus, the cell C1 is applicable to a use in which instantaneous high output is required and a load change is large, such as a vehicle. Herein, the cell C1 can be used solely without a necessity to provide an additional secondary battery or a power storage device such as a capacitor.

Second Embodiment

Figure 2A:
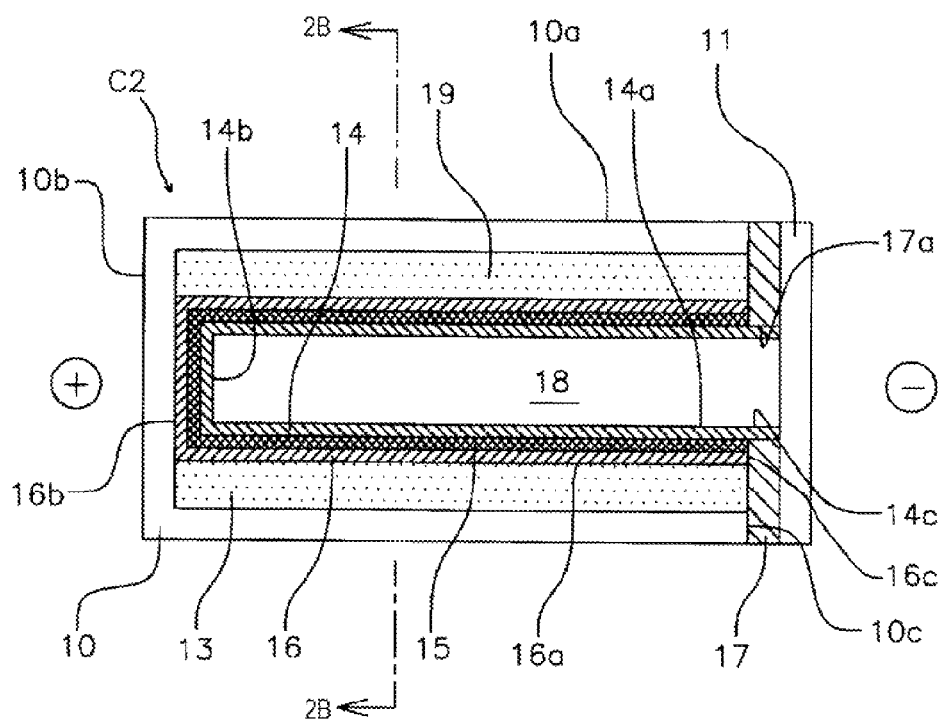
FIG. 2A is a section view illustrating a structure of a fuel cell according to a second embodiment of the invention.
Figure 2B:
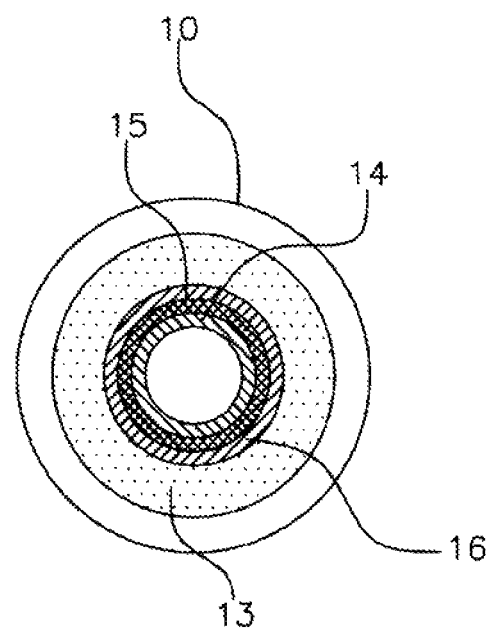
FIG. 2B is a section view taken along line D-D in FIG. 2A.

Next, description will be given of a cell C2 according to a second embodiment of this fuel cell. The cell C2 has a structure which is excellent in pressure-resistant performance and is easily handled. FIGS. 2A and 2B are section views each illustrating the structure of the cell C2. Herein, FIG. 2B is a section view taken along line D-D in FIG. 2A. The cell C2 has a similar basic configuration to that of the cell C1 according to the first embodiment illustrated in FIG. 1. As illustrated in FIG. 2A, however, the cell C2 has a tubular outer casing 10. Thus, the cell C2 exhibits excellent pressure-resistant performance and handling performance. Moreover, the cell C2 has an increased energy density and is easily handled. With regard to the cell C2 according to this embodiment, a negative electrode, a positive electrode, a separator and an electrolyte, which are basic elements of a battery, may have similar substances and structures to those of the cell C1 according to the first embodiment, except respects to be particularly described below.

As illustrated in FIG. 2A, more specifically, the tubular outer casing 10 has a cylindrical portion 10a and a bottom portion 10b. The bottom portion 10b follows one end of the cylindrical portion 10a and corresponds to the bottom of the outer casing 10. The negative electrode 14, the positive electrode 16, and the separator 15 disposed between the negative electrode 14 and the positive electrode 16 are housed inward the bottom portion 10b. Each of the negative electrode 14 and the positive electrode 16 is formed into a one-end closed cylindrical shape. The negative electrode 14 has a cylindrical peripheral wall 14a and a bottom portion 14b, and the positive electrode 16 has a cylindrical peripheral wall 16a and a bottom portion 16b. The positive electrode 16 is disposed inside the outer casing 10 with a space formed between the positive electrode 16 and the outer casing 10 in a radial direction. The negative electrode 14 is disposed inside the positive electrode 16 with the separator 15 interposed between the negative electrode 14 and the positive electrode 16. In the cell C2, the space (radial space) formed between the outer casing 10 and the positive electrode 16 serves as an oxygen storage chamber 19. On the other hand, the space formed inward the negative electrode 14 serves as a hydrogen storage chamber 18.

The outer casing 10 is made of an electroconductive material, specifically, nickel-plated iron. An outer surface of the bottom portion 16b of the positive electrode 16 is bonded to an inner surface of the bottom portion 10b of the outer casing 10. Thus, the outer casing 10 serves as a positive electrode terminal of the cell C2. On the other hand, a disc-shaped negative electrode terminal 11 is bonded to a right end 14c (rightward in FIG. 2A) opposed to the bottom portion 14b in the negative electrode 14. Specifically, the right end 14c of the negative electrode 14 is disposed to protrude rightward from a right end surface 10c of the outer casing 10 and a right end surface 16c of the positive electrode 16. An inner diameter surface 17a of a doughnut-shaped insulating member 17 is fitted to an outer peripheral surface of the right end 14c. The right end surface 10c of the outer casing 10 and the right end surface 16c of the positive electrode 16 are covered with the insulating member 17. Further, an inner surface (leftward in FIG. 2A) which is one of surfaces of the negative electrode terminal 11 is joined to the right end 14c of the negative electrode 14.

The electrodes 14 and 16 each have flexibility. Therefore, when the hydrogen storage chamber 18 is pressurized by hydrogen gas generated by overcharge, the pressure in the hydrogen storage chamber 18 is transferred to the oxygen storage chamber 19. As the result, the electrolyte 13 in the oxygen storage chamber 19 is compressed, so that a pressure thereof rises. The high-pressure electrolyte allows oxygen to dissolve therein in a larger amount.

In the negative electrode 14, a surface being in contact with the hydrogen storage chamber 18 contains a hydrophobic material in a large amount. Thus, a hydrogen storage alloy in the negative electrode 14 can be brought into contact with hydrogen gas without being wetted. Also in the negative electrode 14, a surface being in contact with the separator 15 has a hydrophilic property, and therefore is kept at a state that this surface is almost always wetted with the electrolyte. Thus, hydrogen gas is prevented from passing through the negative electrode 14, and the ion conductivity of the negative electrode 14 is ensured.

Description will be given of dimensions of the outer casing 10. An outer diameter of the outer casing 10 may fall within a range from 13.5 mm to 14.5 mm. Moreover, a length of the outer casing 10 may fall within a range from 49.0 mm to 50.5 mm. The outer diameter of the outer casing 10 may also fall within a range from 10.5 mm to 9.5 mm. The length of the outer casing 10 may also fall within a range from 42.5 mm to 44.5 mm. The dimensions, which fall within the ranges described above, of the outer casing 10 allow realization of dimensional compatibility with a commercially available R6 battery or R03 battery.

The cell C2 according to the second embodiment produces the following advantageous effects in addition to the advantageous effects produced by the cell C1 according to the first embodiment.

As illustrated in FIGS. 2A and 2B, the outer casing 10 of the cell C2 has the tubular structure. This facilitates the securing of excellent pressure resistance and enhancement of an energy density. Further, a battery module having large charge and discharge capacities is easily configured by connecting a large number of cells C2 in parallel and in series. In the cell C2 according to this embodiment, particularly, the oxygen storage chamber 19 is formed in the radial space. Further, the hydrogen storage chamber 18 is formed inward the negative electrode 14. Therefore, there is no necessity to provide additional members for forming the hydrogen storage chamber 18 and oxygen storage chamber 19. Accordingly, the cell C2 has the simple structure, and therefore can be formed using only minimal members. Accordingly, the cell C2 has the small dimensions, and therefore has high pressure resistance and energy density. Regardless of this configuration, the cell C2 is easily assembled because the parts count is small.

Modification Example of Second Embodiment

Figure 3:
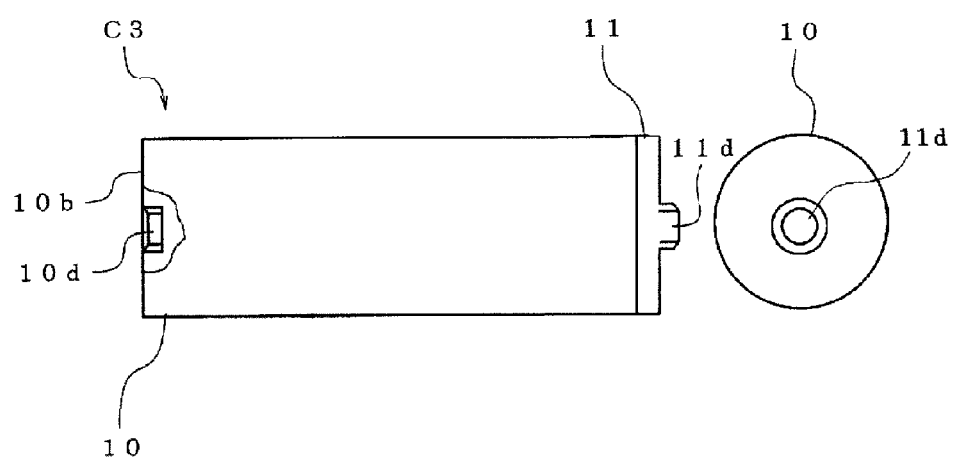
FIG. 3 is a section view illustrating a structure of a fuel cell according to a second modification example of the second embodiment of the invention.

Next, description will be given of a cell C3 according to a modification example of the second embodiment of this fuel cell. FIG. 3 is a partial cutaway view illustrating a connection structure of the cell C3. The cell C3 corresponds to the cell C2 according to the second embodiment in which the outer structure is partially changed. Hereinafter, description will be mainly given of the change. The cell C3 has a negative electrode terminal 11 electrically connected to a negative electrode 14, at one end thereof in an axial direction (an axial direction of an outer casing 10). Moreover, the cell C3 has a positive electrode terminal corresponding to the outer casing 10 electrically connected to a positive electrode 16, at the other end thereof in the axial direction. As illustrated in FIG. 3, a projection 11d is formed on the center of the negative electrode terminal 11. Moreover, a bottom recess 10d is formed on the center of a bottom portion 10b of the outer casing 10. The projection 11d and the bottom recess 10d are shaped to be fittable together. Thus, two cells C3 can be connected in series.

According to this configuration, it is possible to connect a plurality of cells C3 in series without a necessity to provide wires. In the example illustrated in FIG. 3, a ridge is formed on an outer periphery of the projection in the axial direction. On the other hand, a groove is formed on an inner circumferential surface of the bottom recess. Moreover, the ridge of the projection can be fitted into the groove of the bottom recess. However, the form of this fitted portion is not limited thereto.

Each of the positive electrode terminal (outer casing 10) and the negative electrode terminal 11 may have a screw portion. More specifically, the projection 11d of the negative electrode terminal 11 may be formed as a male screw, and the recess 10d formed on the bottom portion 10b of the outer casing 10 may be formed as a female screw. Thus, two cells C2 can be connected to each other with reliability.

In the cell C3, an oxygen storage chamber (not illustrated) may be filled with an electrolyte in which oxygen dissolves. Alternatively, the oxygen storage chamber may be filled with the oxygen-dissolved electrolyte and oxygen gas.

Figure 4A:
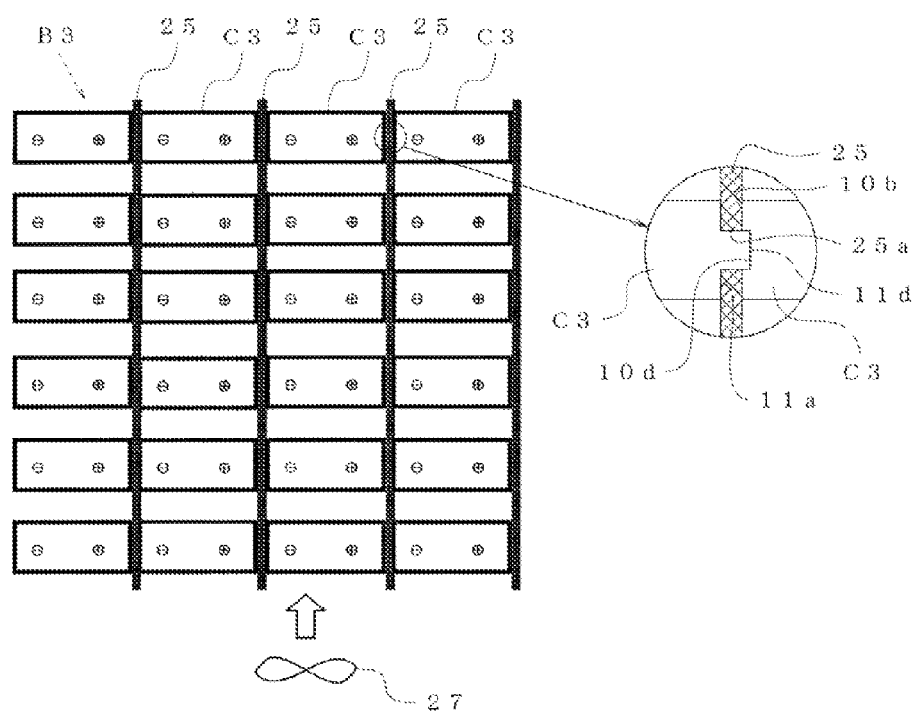
FIG. 4A is a view illustrating a structure of a battery module configured with the fuel cell according to the modification example illustrated in FIG. 3, in which a circled portion is an enlarged view illustrating main parts.
Figure 4B:
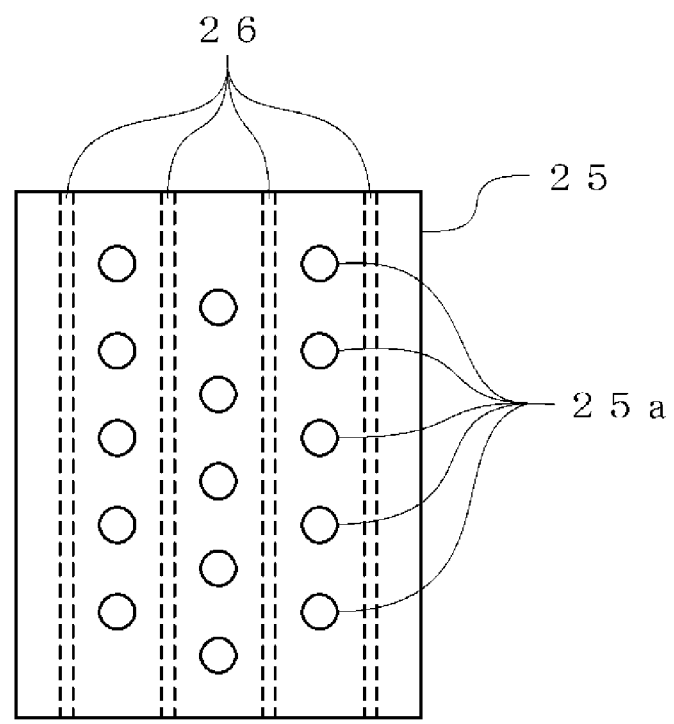
FIG. 4B is a front view illustrating a current collector plate in FIG. 4A.

FIGS. 4A and 4B each illustrate a structure of a battery module B3 including a plurality of cells C3 connected to one another. The battery module B3 includes a pair of electrically conductive current collector plates 25 opposed to each other. The plurality of cells C3 is disposed between the current collector plates 25. The outer casing 10 serving as a positive electrode terminal is in contact with one of the current collector plates 25. The negative electrode terminal 11 is in contact with the other current collector plate 25. In order to maintain this state, the cells C3 are arranged in parallel. In the battery module B3, cell groups each including the plurality of cells C3 connected in parallel are connected in series (FIG. 4A).

This configuration is allowed to eliminate the necessity of wires for connecting the cells C3. This facilitates the assembly of the battery module B3. As illustrated in a main part enlarged view corresponding to a circled portion in FIG. 4A, a through hole 25a may be formed on the current collector plate 25. In this instance, the projection 11d of the cell C3 is fitted into the bottom recess 10d of the different cell C3 through the through hole 25a. This further facilitates the assembly of the battery module B3. According to this structure, the plurality of cell C3 is supported by the current collectors 25. Accordingly, the battery module B3 has a free-standing structure as a battery pack. Herein, the cell in the battery module B3 is not limited to the cell C3, but may be the cell C2.

An air fan 27 may be provided for feeding cooling air in a parallel direction of the current collector plates 25. Heat generated from the cell C3 is transferred to the current collector plate 25. The current collector plate 25 acts as a radiation fin, so that the cell C3 is indirectly cooled. The current collector plate 25 plays a role of an electroconductive member and a role of a radiation member. Therefore, the current collector plate 25 may be made of a material with high thermal conductivity and electric conductivity. As for this point of view, aluminum has relatively low electric resistance and relatively large thermal conductivity. Therefore, aluminum has preferable characteristics as a material for the current collector plate 25. However, since aluminum is prone to be oxidized, the contact resistance of the current collector plate 25 tends to increase. Therefore, an aluminum plate that forms the current collector plate 25 may be subjected to nickel plating. This achieves the reduction of the contact resistance. The current collector plate 25 is provided with a plurality of coolant passages 26 for passing insulating oil for cooling (see FIG. 4B). Moreover, the cells C3 (through holes 25a) may be arranged in a staggered shape (see FIG. 4B). Thus, cooling air from the air fan 27 is directly blown on the side surface of the cell C3. As the result, a cooling effect is enhanced. If the battery module is cold, the air fan 27 may blow air warmed by a heater (not illustrated). Thus, the battery module can be warmed.

Battery System Including Fuel Cell of Second Embodiment

Figure 5:
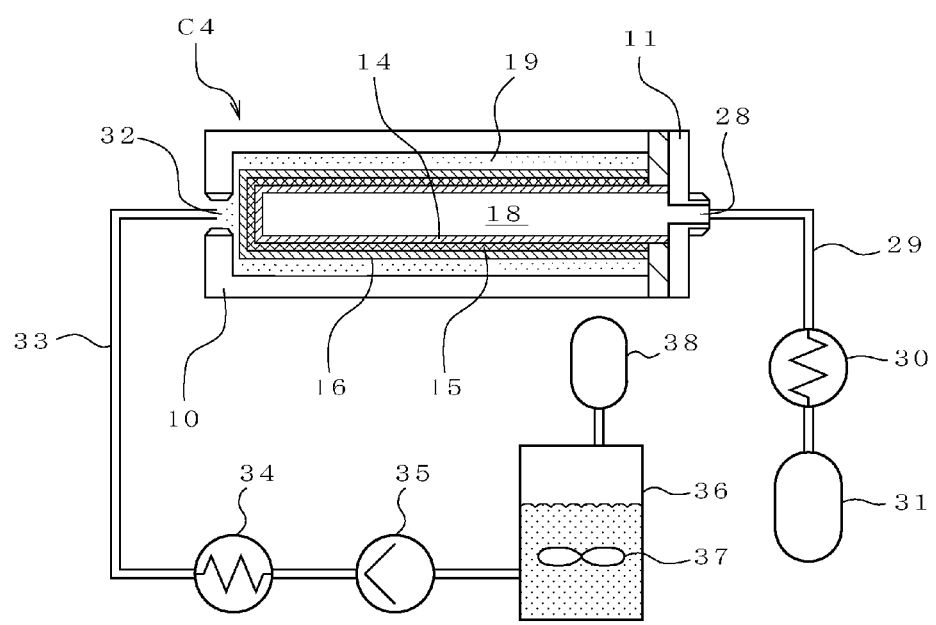
FIG. 5 is a configuration diagram illustrating a process using the fuel cell according to the second embodiment.

Next, description will be given of a battery system including the fuel cell according to the second embodiment. FIG. 5 is a configuration diagram illustrating a process using a fuel cell C4 according to the present invention. The cell C4 corresponds to the cell C3 which is partially changed. The cell C4 has a bottom portion provided with an oxygen circulation port 32 communicating with an oxygen storage chamber 19, and a projection 11d provided with a hydrogen circulation port 28 communicating with a hydrogen storage chamber 18. The oxygen circulation port 32 is connected to a cooler 34 via a conduit 33. The cooler 34 cools an electrolyte heated by the operation of the cell C4. The electrolyte from the cooler 34 is fed to an electrolyte storage source 36. The electrolyte in the electrolyte storage source 36 is stirred by a stirrer 37, so that generated oxygen gas is supplied from the top of the electrolyte storage source 36 to an oxygen source 38, and then is stored in the oxygen source 38. On the other hand, the hydrogen circulation port 28 is connected to a cooler 30 via a conduit 29. The cooler 30 cools hydrogen gas. The hydrogen gas from the cooler 30 is stored in a hydrogen source 31.

The high-concentration oxygen-dissolved electrolyte in the electrolyte storage source 36 can be supplied to the oxygen storage chamber 19 by a pump 35. Moreover, high-pressure hydrogen gas can be supplied from the hydrogen source 31 to the hydrogen storage chamber 18.

Third Embodiment

Figure 6A:
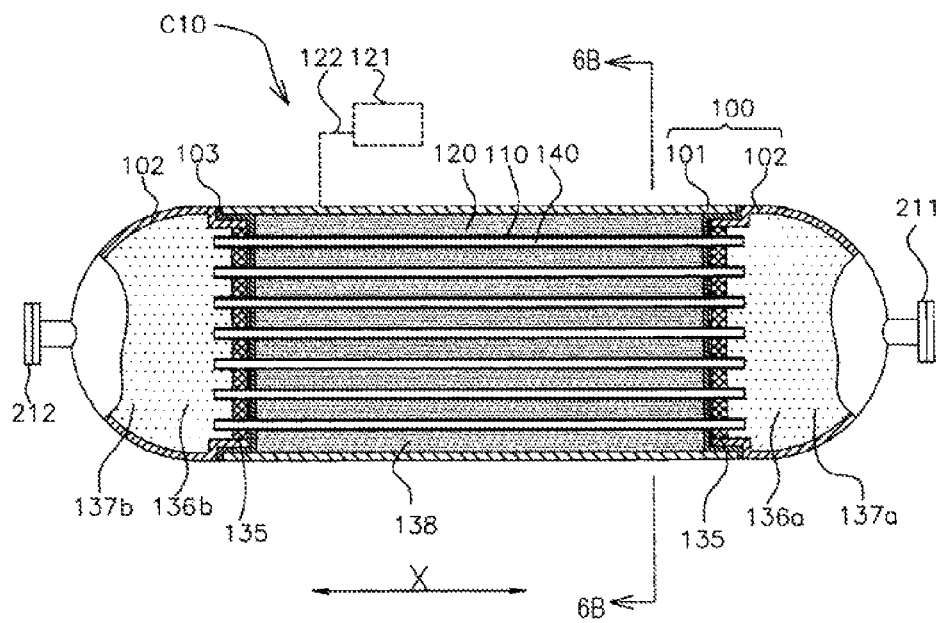
FIG. 6A is a partial cutaway side view illustrating a structure of a reversible fuel cell according to a third embodiment of the invention.
Figure 6B:
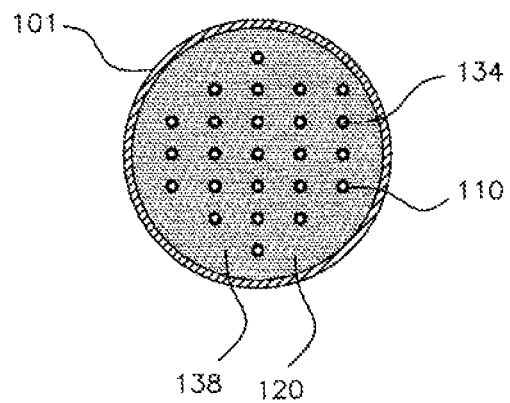
FIG. 6B is a section view taken along line A-A in FIG. 6A.

FIGS. 6A and 6B are section views each illustrating a structure of a reversible fuel cell C10 according to a third embodiment of this fuel cell (hereinafter, simply referred to as a cell C10). More specifically, FIG. 6A is a partial cutaway view in a longitudinal direction. FIG. 6B is a section view taken along line A-A in FIG. 6A. The cell C10 has a structure covered with an outer jacket 100. In the outer jacket 100, a plurality of tubular positive electrodes 110 is housed in an axial direction of the outer jacket 100 (a direction X in FIG. 6A). Moreover, a negative electrode 120 is filled and disposed around the positive electrode 110 with a separator 130 interposed between the negative electrode 120 and the positive electrode 110. The negative electrode, the positive electrode, the separator and an electrolyte which are basic elements of the cell C10 according to this embodiment may have similar substances, compositions and structures to those of the cell C1 according to the first embodiment, except instances to be particularly described below.

The outer jacket 100 has a cylindrical body part 101 and bulging parts 102. The bulging parts 102 are provided on openings formed at two ends of the body part 101. The bulging part 102 bulges outward the opening so as to be away from the opening, and covers the opening. A gasket 103 is disposed between the body part 101 and the bulging part 102 in order to keep the fluid-tightness inside the outer jacket 100. Each of the body part 101 and the bulging part 102 may be made of steel, preferably high-tensile strength steel. Thus, the body part 101 has the cylindrical shape, and the bulging part 102 bulges outward. Accordingly, the outer jacket 100 is capable of structurally enduring ultrahigh pressure.

In the outer jacket 100, oxygen storage chambers 136a and 136b are provided on inward spaces of the bulging parts 102, respectively. Each of the right and left oxygen storage chambers 136a and 136b is defined by a partition 135. The oxygen storage chambers 136a and 136b can be connected to an external device through flanges 211 and 212 each attached to the outer jacket 100. The positive electrode 110, the negative electrode 120, the separator 130 and a current collector 134 are disposed in a space formed between the oxygen storage chambers 136a and 136b and surrounded with the partitions 135 and the body part 101.

Figure 7:
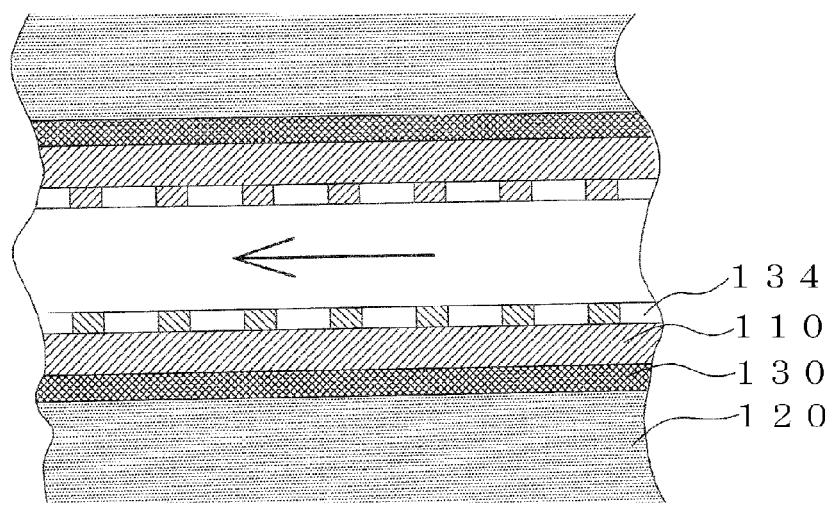
FIG. 7 is a horizontal section view schematically illustrating a structure of an electrode portion in the reversible fuel cell according to the third embodiment of the invention.

FIG. 7 is a partial cutaway view illustrating an electrode structure of the cell C10. The current collector 134 is a nickel-plated, perforated steel pipe. The positive electrode 110 is formed in such a manner that a paste mixture containing manganese dioxide is applied around the current collector 134. The positive electrode 110 may be formed in such a manner that the mixture is directly applied to the current collector 134. Alternatively, the positive electrode 110 may be formed in such a manner that a positive electrode sheet obtained by applying the mixture to a foamed nickel substrate is wound around the current collector 134. The separator 130 is interposed between the positive electrode 110 and the negative electrode 120 containing an oxygen storage alloy. The separator 130 prevents contact between the positive electrode 110 and the negative electrode 120. The oxygen storage chambers 136a and 136b located at the right and left ends of the outer jacket 100 communicate with each other through the current collector 134. The electrolyte 137 in each of the oxygen storage chambers 136a and 136b can flow in a direction shown with an arrow mark in FIG. 7.

A space formed between the right and left partitions 135 and located outward the separator 130 is filled with a hydrogen storage alloy having a mean particle diameter of 20 μm. According to this configuration, a voidage is about 35%. The voidage varies depending on a method for filling the hydrogen storage alloy. The voidage may be larger than 35%. When the mean particle diameter is 5 to 50 μm, the voidage is about 30 to 60%. A void formed as described above serves as a hydrogen storage chamber 138. Herein, the value of the mean particle diameter is obtained using a sphere equivalent diameter based on light scattering of JIS Z 8910 as in the other embodiments.

As shown with a broken line in FIG. 6A, a hydrogen gas storage source 121 and a storage passage 122 are connected to the hydrogen storage chamber 138 in the cell C10. The negative electrode 120 can be charged with hydrogen gas supplied from the outside.

The current collector 134 of the positive electrode passes through partitions 135 made of nickel-plated steel. The two ends of the current collector 134 are supported by the partitions 135. Therefore, the bulging part 102 is electrically connected to the positive electrode 110 via the partition 135. Thus, the bulging part 102 serves as a positive electrode terminal of the cell C10. Moreover, the body part 101 which is in direct contact with the negative electrode 120 serves as a negative electrode terminal. The gasket 103 has not only a sealing property, but also an insulating property. Thus, the gasket 103 prevents a short circuit between the positive electrode 110 and the negative electrode 120.

Next, description will be given of the operations of the cell C10 configured as described above. The electrolyte 137 in which oxygen dissolves is fed to the cell C10 through one of the flanges 211 (the right side of FIG. 6A). The electrolyte 137 is an electrolyte in which oxygen dissolves in a high concentration, and can be referred to as a high-concentration oxygen-dissolved electrolyte. The high-concentration oxygen-dissolved electrolyte 137 flows into the pipe-shaped current collector 134, passes through the perforation formed on the current collector 134, and comes into contact with the positive electrode 110. Thus, manganese oxyhydroxide in the positive electrode is oxidized with oxygen dissolving in the electrolyte, and is changed to manganese dioxide. As the result, the positive electrode is charged. Thus, oxygen dissolving in the electrolyte is consumed to generate $H_2O$, so that the concentration of oxygen in the electrolyte is lowered. The electrolyte 137 in which the oxygen concentration is lowered (low-concentration oxygen-dissolved electrolyte) is flown into the left oxygen storage chamber 136b, and finally is released from the flange 212 to the outside of the system. On the other hand, the negative electrode 120 is charged with hydrogen gas to be supplied from the external hydrogen gas storage source 121.

The cell C10 is discharged in such a manner that an electrical load is connected between the bulging part 102 serving as the positive electrode terminal and the body part 101 serving as the negative electrode terminal via a wiring cable (not illustrated). Thus, electric current is fed to the electrical load. The load electric current can be taken out from both the two bulging parts 102. Therefore, the electric current flowing though the current collector 134 is split into two one of which is fed to the right and the other one of which is fed to the left, so that the Joule loss is reduced to about one fourth.

Next, description will be given of an instance where the cell C10 is charged by converting electric energy into chemical energy. In the cell C10, the hydrogen storage chamber 138 is capable of storing hydrogen gas generated by overcharge. Also in the cell C10, each of the oxygen storage chambers 136a and 136b is capable of storing oxygen in a state that the oxygen dissolves in the electrolyte. That is, the cell C10 according to this embodiment is capable of storing electric energy by converting the electric energy into chemical energy. Further, the cell C10 is capable of outputting electric energy as appropriate by converting the chemical energy into electric energy. Unlike a conventional secondary battery, therefore, the cell C10 has no limitation on a power accumulation capacity due to an amount of the active material.

As in the cell C1 according to the first embodiment, the cell C10 according to this embodiment is discharged by the battery reaction at the time of discharge and is charged with hydrogen gas and oxygen. At the time of the charge and discharge described above, manganese dioxide serves as a catalyst for a reaction in the positive electrode. On the other hand, the hydrogen storage alloy serves as a catalyst for a reaction in the negative electrode.

Figure 8:
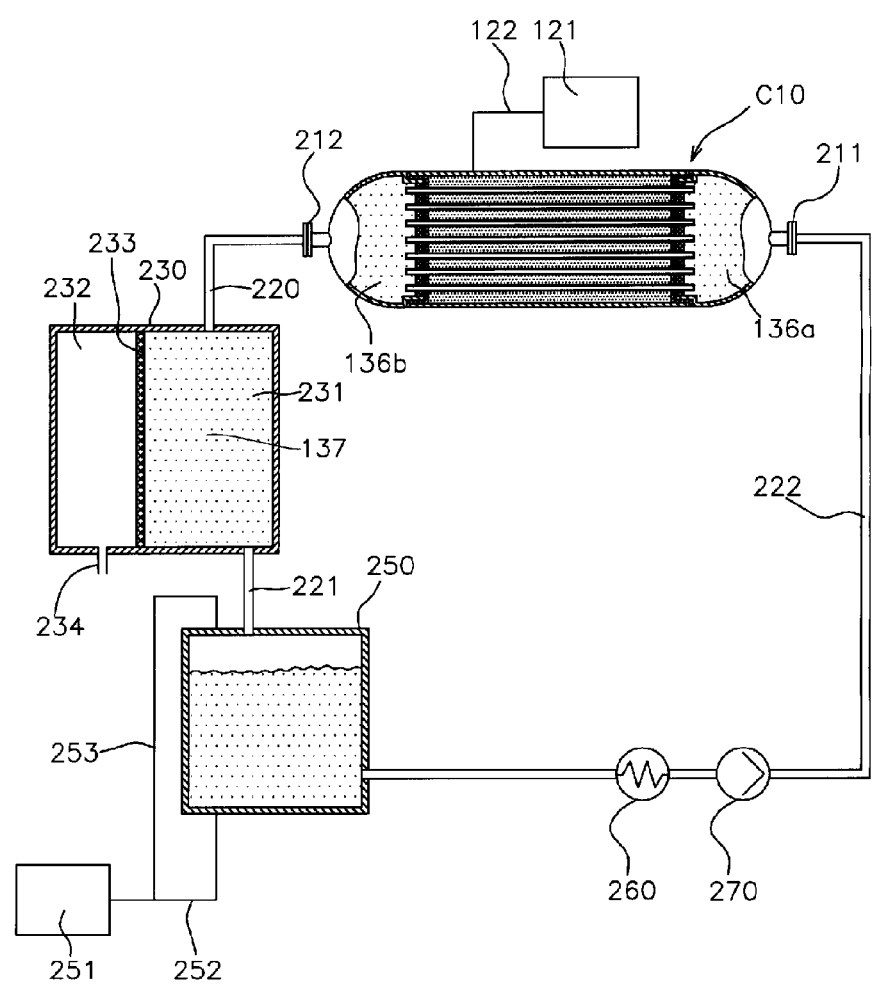
FIG. 8 is a system diagram illustrating a power generation process using the reversible fuel cell according to the third embodiment of the invention.

FIG. 8 illustrates a power generation process using the cell C10 according to the fourth embodiment. A conduit 220 is connected to the cell C10 via the flange 212. The electrolyte 137 degraded by the discharge of the cell C10 is flown into a first chamber 231 of a salt concentration adjusting apparatus 230 through the conduit 220. A reverse osmosis membrane 233 is attached to the salt concentration adjusting apparatus 230. The salt concentration adjusting apparatus 230 is divided into the first chamber 231 and a second chamber 232 by the reverse osmosis membrane 233. The reverse osmosis membrane 233 has a function of allowing water in the electrolyte 137 to selectively pass therethrough. The passed water is retained as a drain in the second chamber 232, and is released from a drain outlet 234 to the outside of the system. The electrolyte 137 in the salt concentration adjusting apparatus 230 is carried to an oxygen concentration adjusting apparatus 250 through a conduit 221. The oxygen concentration adjusting apparatus 250 has a bottom to which an oxygen storage source 251 and a storage passage 252 are connected. Oxygen gas is in contact with the electrolyte 137, so that the concentration of dissolved oxygen in the electrolyte is enhanced. Herein, the oxygen concentration adjusting apparatus 250 is provided with a separate storage passage 253, so that oxygen generated by overcharge can be stored in the oxygen storage source 251. Thus, the high-concentration oxygen-dissolved electrolyte in the oxygen storage source 251 can be returned to the oxygen concentration adjusting apparatus 250. This electrolyte can be utilized for adjustment of the oxygen concentration lowered by discharge.

The temperature of the electrolyte 137 from the oxygen concentration adjusting apparatus 250 rises because of the use of the cell. The electrolyte 137 is cooled by a cooler 260 so as to reach a predetermined temperature. Thereafter, the electrolyte 137 is pressed by a pump 270, and is returned to the cell C10 through a conduit 222.

Fourth Embodiment

Figure 9:
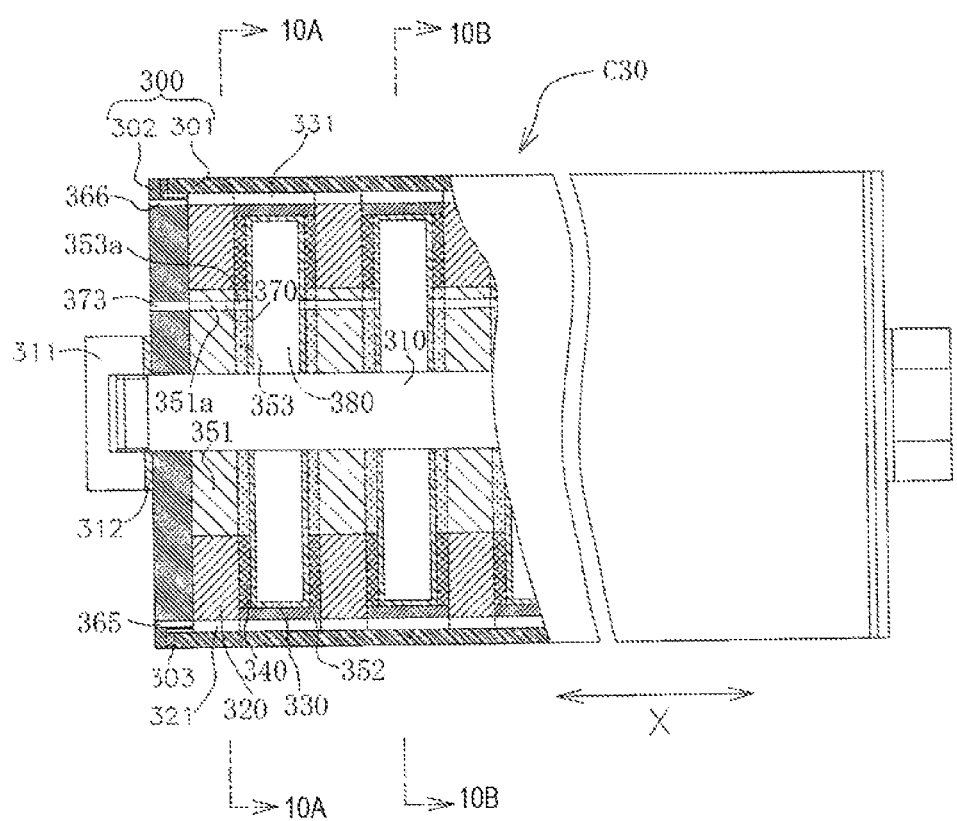
FIG. 9 is a horizontal section view illustrating a structure of a reversible fuel cell according to a fourth embodiment of the invention.

FIG. 9 is a section view schematically illustrating, in an axial direction, a reversible fuel cell according to a fourth embodiment of this fuel cell (hereinafter, simply referred to as a cell C30). A negative electrode, a positive electrode, a separator and an electrolyte which are basic elements of the cell C30 according to this embodiment may have similar substances, compositions and structures to those of the cell C1 according to the first embodiment, except respects to be particularly described below. As illustrated in FIG. 9, the cell C30 includes, as main constituent elements, an outer casing 300, a current collector 310, and the electrodes housed in the outer casing. The outer casing 300 includes a round pipe 301 and disc-shaped lid members 302. The lid members 302 are provided on openings formed at two ends of the round pipe 301. Each of the round pipe 301 and the lid member 302 is made of nickel-plated iron.

The current collector 310 is made of electrically conductive nickel-plated iron formed into a rod shape. The current collector 310 has two ends passing through holes formed on the centers of the lid members 302. The two ends of the current collector 310 are screwed into nuts 311. These nuts 311 fix the current collector 310 to the lid members 302. Each of the nuts 311 is formed into a bag shape. This prevents the electrolyte from being leaked from the cell. A gasket 312 having an insulating property is provided between the nut 311 and the lid member 302. The gasket 312 prevents electrical contact between the current collector 310 and the lid member 302. A gasket 303 for sealing the cell is provided between the round pipe 301 and the lid member 302. The gasket 303 has an insulating property. Therefore, the gasket 303 prevents electrical contact between the round pipe 301 and the lid member 302. The current collector 310 is subjected to nickel plating, and therefore is prevented from being corroded by the electrolyte.

The positive electrode 320 and the negative electrode 330 are stacked in an axial direction of the round pipe 301 (a direction X in FIG. 9) with the separator 340 interposed therebetween. The positive electrode 320 and the negative electrode 330 are housed in the outer casing 300. The separator retains the electrolyte. The separator 340 allows insulation between the positive and negative electrodes, and also allows ions to pass therethrough. The positive electrode 320 is made of a foamed nickel substrate filled with manganese dioxide. The negative electrode 330 is made of a foamed nickel substrate filled with a hydrogen storage alloy. Thus, hydrogen gas is capable of passing through the negative electrode. The positive electrode 320 is formed into a substantially disc shape and has an outer diameter which is slightly larger than an inner diameter of the round pipe 301. The positive electrode 320 is partially cut at positions spaced away from each other by 180 degrees on an outer periphery thereof. The outer periphery of the positive electrode 320 is in contact with an inner surface of the round pipe 301, except the cut portions (see FIG. 10A). A notch 321 is formed between the cut portion of the positive electrode 320 and the round pipe 301. A PP gasket 351 which is made of polypropylene and has the same thickness as the positive electrode 320 is interposed between the positive electrode 320 and the current collector 310 in the positive electrode 320. This PP gasket 351 allows insulation between the positive electrode 320 and the current collector 310.

Figure 10A:
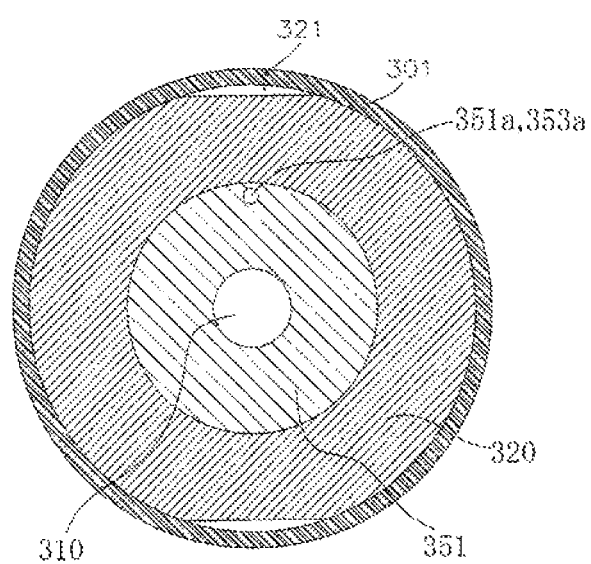
FIG. 10A is a section view taken along line B-B in FIG. 9.
Figure 10B:
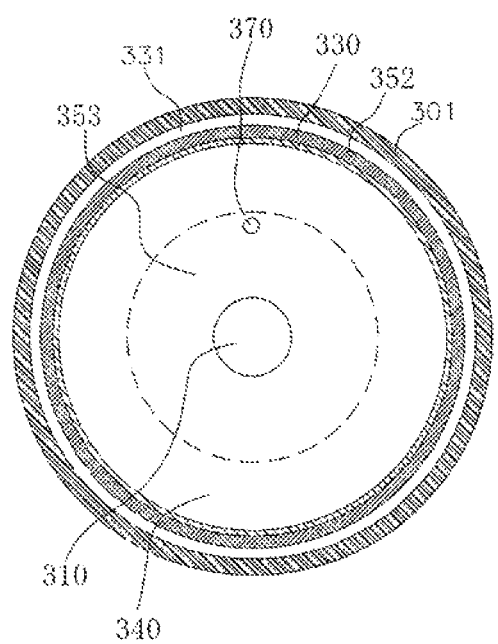
FIG. 10B is a section view taken along line C-C in FIG. 9.

FIG. 10A illustrates a section of the cell C30 taken along line B-B, and FIG. 10B illustrates a section of the cell C30 taken along line C-C.

The negative electrode 330 has a disc shape. The negative electrode 330 has a U-shaped section and is opened in an inner circumferential direction. The current collector 310 passes through a hole formed on the center of the negative electrode 330. This through hole has a diameter which is slightly smaller than an outer diameter of the current collector 310. Therefore, the inner diameter portion of the negative electrode 330 and the outer diameter portion of the current collector 310 are in contact with each other. A space surrounded with the negative electrode 330 and the current collector 310 forms a hydrogen storage chamber 380. The separator 340 is interposed between the positive electrode 320 and the negative electrode 330. In the negative electrode 330, an outer peripheral surface in a radius direction is covered with a PP gasket 352. An outer diameter of the PP gasket 351 is smaller than an inner diameter of the round pipe 301. Therefore, a space (clearance) 331 is formed between the PP gasket 351 and the round pipe 301 (see FIG. 10B). In the negative electrode 330, further, the portion which does not face the separator 340 and the hydrogen storage chamber 380 is covered with a PP gasket 353.

Figure 11:
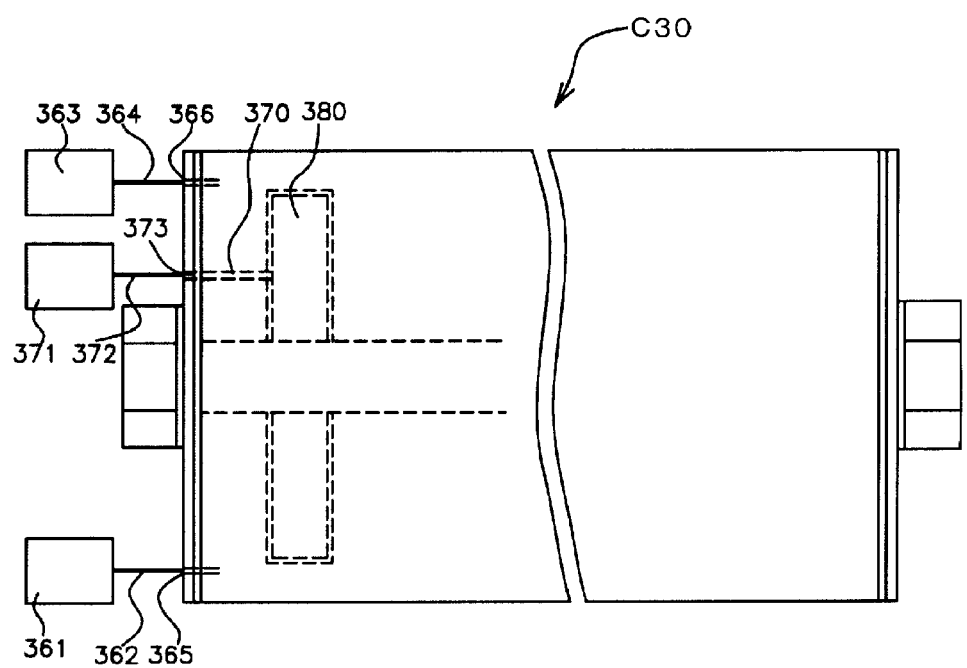
FIG. 11 is a system diagram illustrating a relation between the reversible fuel cell according to the fourth embodiment of the invention and an external system.

The lid member 302 has a hydrogen gas supply port 373. The positive electrode 320 has an aperture 351a, and the PP gasket 353 has an aperture 353a. Each of the apertures 351a and 353a forms a hydrogen gas passage 370 communicating with the hydrogen storage chamber 380. As illustrated in FIG. 11, a high-pressure hydrogen gas storage source 371 is connected to the hydrogen gas supply port 373 via a storage passage 372. High-pressure hydrogen gas can be supplied to each hydrogen storage chamber 380 through the hydrogen gas passage 370.

An electrolyte inlet 365 and an electrolyte outlet 366 corresponding to an inlet and an outlet for the oxygen-dissolved electrolyte are provided on the lid member 302 at positions spaced away from each other by 180 degrees. The electrolyte inlet 365 and the electrolyte outlet 366 communicate with the notches 321, respectively. Moreover, the notch 321 communicates with the clearance 331 formed between the PP gasket 351 and the round pipe 301. Therefore, the electrolyte entering through the electrolyte inlet 365 circulates through the cell C30 along the inner surface of the round pipe 301, and then is released from the electrolyte outlet 366. As illustrated in FIG. 11, a high-concentration oxygen-dissolved electrolyte supply source 361 is connected to the electrolyte inlet 365 via a supply passage 362. On the other hand, an electrolyte adjusting chamber 363 is connected to the electrolyte outlet 366 via a release passage 364. The electrolyte containing a low concentration of oxygen is treated in the electrolyte adjusting chamber 363.

Figure 12:
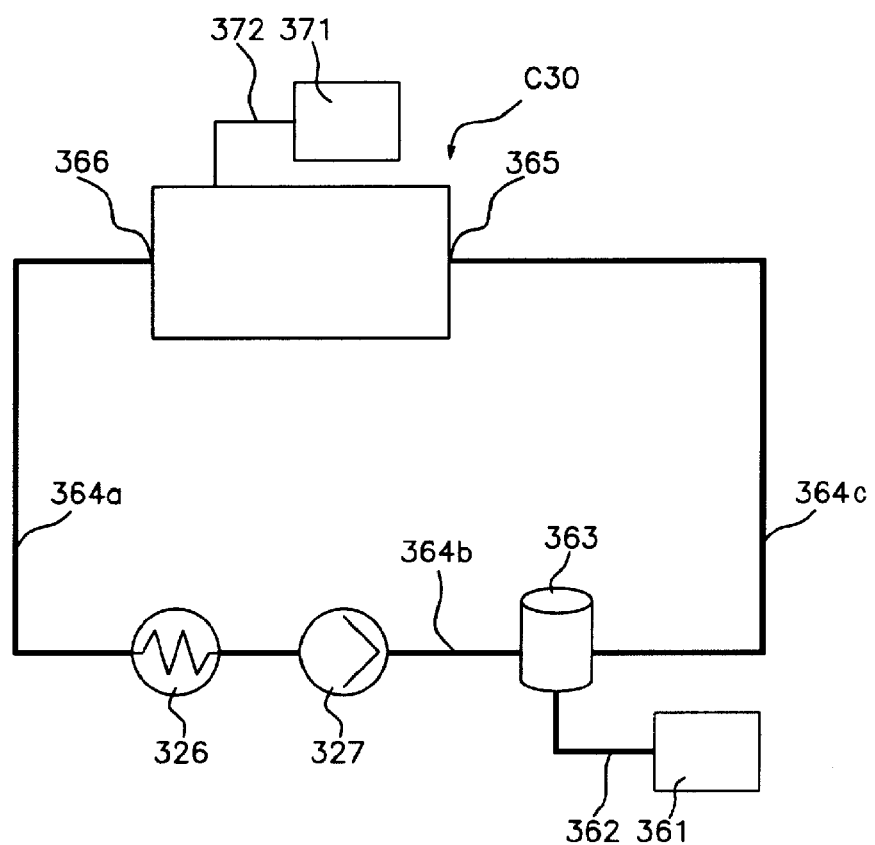
FIG. 12 is a system diagram illustrating an electrolyte treatment process using the reversible fuel cell according to the fourth embodiment of the invention.
Figure 13A:
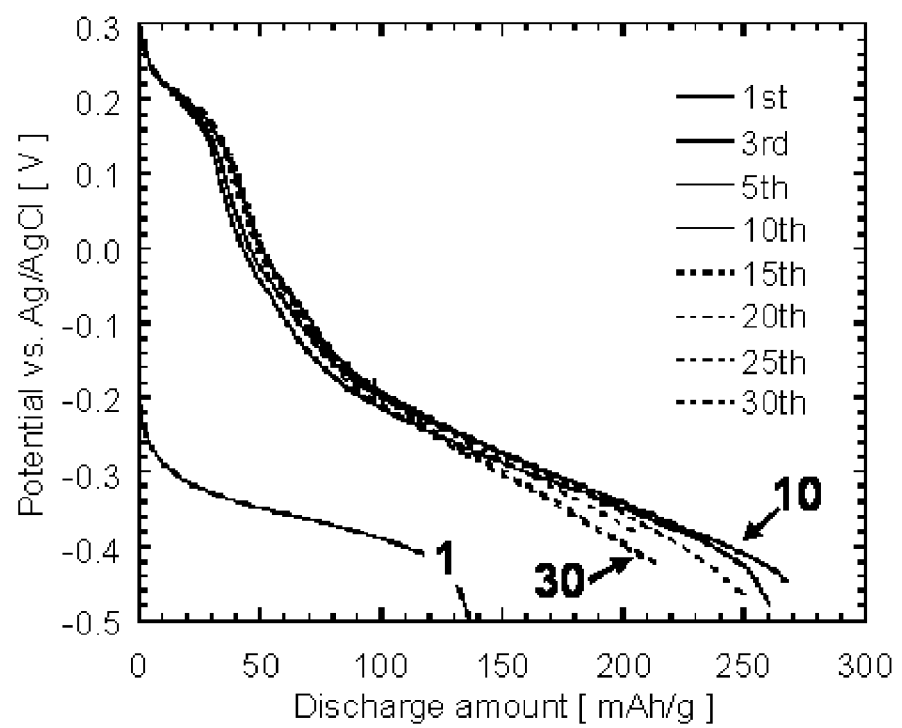
FIG. 13A is a graph illustrating a discharge characteristic of a manganese dioxide positive electrode (in a one-electron reaction).
Figure 13B:
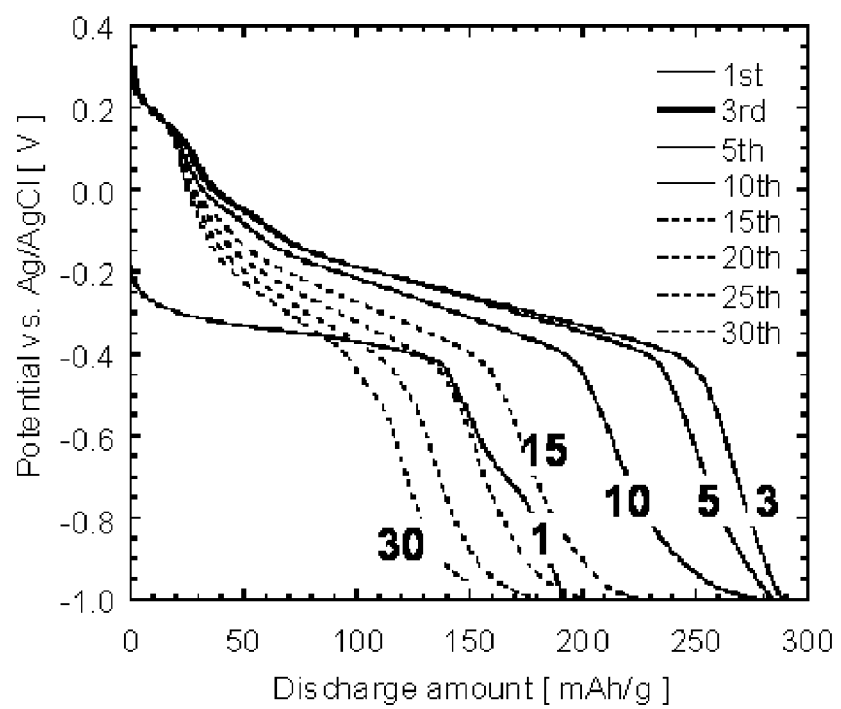
FIG. 13B is a graph illustrating the discharge characteristic of the manganese dioxide positive electrode (in a two-electron reaction).
Figure 14:
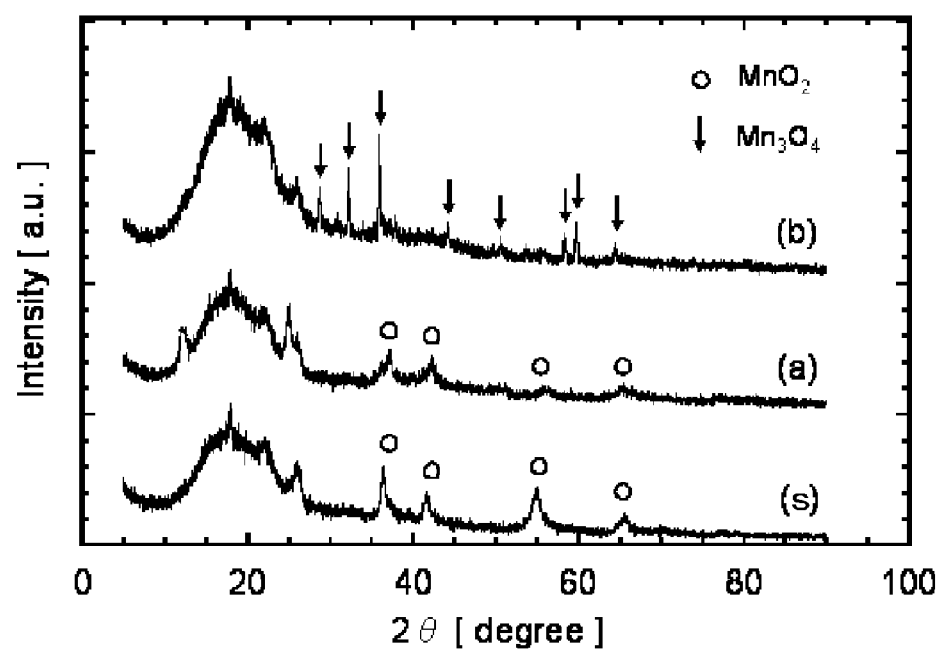
FIG. 14 is a graph illustrating results of XRD measurement for examining a change of composition in the manganese dioxide positive electrode in accordance with a difference in the depth of discharge.
Figure 15A:
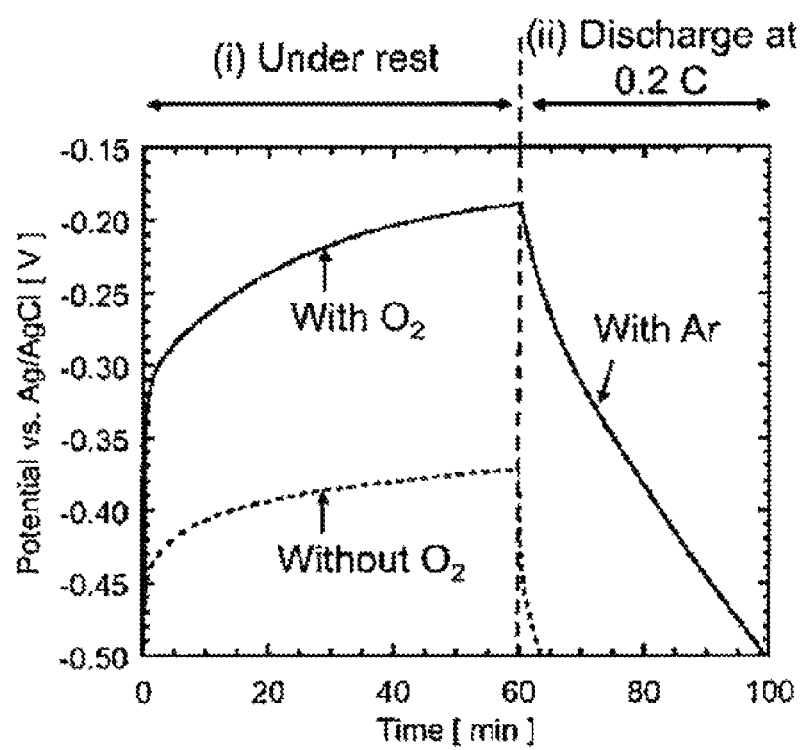
FIG. 15A is a graph illustrating results of experiment in which the manganese dioxide electrode is charged with oxygen gas.
Figure 15B:
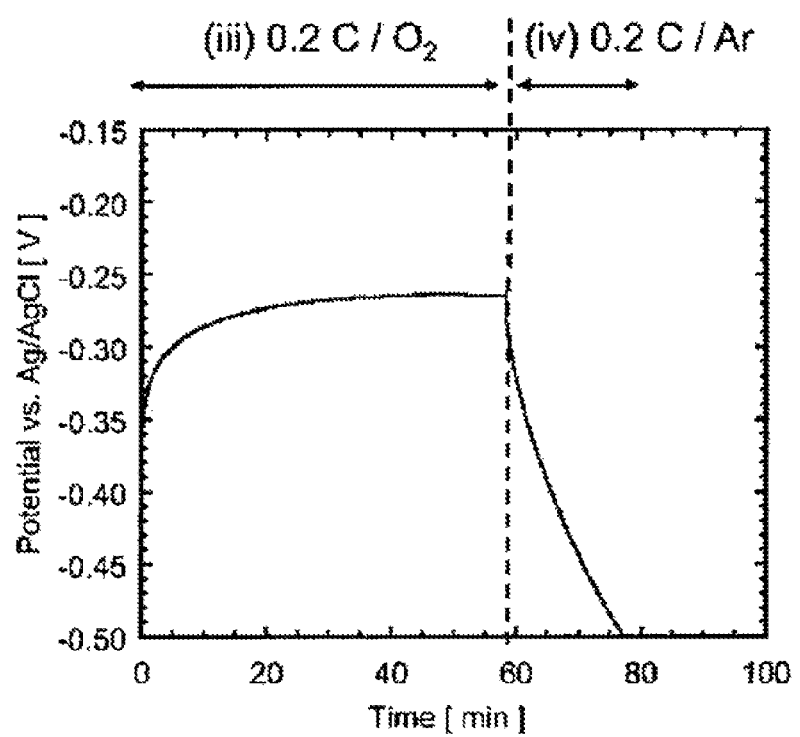
FIG. 15B is a graph illustrating results of another experiment in which the manganese dioxide electrode is charged with oxygen gas.

FIG. 12 is a system diagram illustrating an electrolyte treatment process related to the cell C30 according to a fifth embodiment. The electrolyte from the electrolyte outlet 366 of the cell C30 is fed to a cooler 326 through a conduit 364a. The electrolyte heated by the use of the cell is cooled by the cooler 326 to reach a certain temperature. Thereafter, the electrolyte is pressed by a pump 327, and is carried to the electrolyte adjusting chamber 363 via a conduit 364b. Herein, water is partially and selectively removed from the electrolyte. Moreover, the electrolyte receives the supply of oxygen from the electrolyte supply source 361. Thus, the oxygen concentration of the electrolyte is adjusted. Thereafter, the electrolyte is returned to the cell C30 through a conduit 364c.

Next, description will be given of the functions of the cell C30. As described above, hydrogen gas supplied from the hydrogen gas supply port 373 is led to the hydrogen storage chamber 380, so that the negative electrode 330 is charged. On the other hand, the high-concentration oxygen-dissolved electrolyte from the electrolyte inlet 365 is fed from the notch 321 to the positive electrode 320, so that the positive electrode 320 is charged. When the positive electrode 320 is charged, $H_2O$ is generated. This $H_2O$ is mixed into the electrolyte, and then is released from the electrolyte outlet 366 to the outside of the cell C30.

As in the charge and discharge in the cell C1 according to the first embodiment, at the time of discharge, the cell C30 according to this embodiment is discharged by the function as a secondary battery, and is chemically charged with hydrogen gas and oxygen. That is, the cell C30 is discharged as a secondary battery and, at the same time, is charged with gas. Herein, manganese dioxide serves as a catalyst for a reaction in the positive electrode. On the other hand, the hydrogen storage alloy serves as a catalyst for a reaction in the negative electrode. Further, the cell C30 can be charged with electric current. Hydrogen gas generated by overcharge can be stored in the hydrogen gas storage source 371 through the hydrogen gas passage 370 and the storage passage 372. Moreover, oxygen gas can be stored in the state that the oxygen gas dissolves in the electrolyte. In other words, the cell C30 according to this embodiment is capable of storing electric energy by converting the electric energy into chemical energy. Unlike a conventional secondary battery, therefore, the cell C30 has no limitation on a power accumulation capacity due to an amount of the active material.

In the cell C30, hydrogen gas is supplied to the negative electrode. Therefore, the negative electrode is not oxidized even by discharge. Accordingly, the lifetime of the negative electrode is not degraded because of volume expansion and contraction. The positive electrode is charged by the oxidization using oxygen in the oxygen-dissolved electrolyte. Therefore, the positive electrode is not degraded by discharge.

<Energy Efficiency of Reversible Fuel Cell>

In the instance where electric power is generated using a chemical reaction, a relation of $\Delta H = \Delta G + T\Delta S$ is established, wherein $\Delta H$ represents energy to be obtained from used chemicals, $\Delta G$ represents an amount of generated electricity, and $T\Delta S$ represents generated heat.

Figure 17:
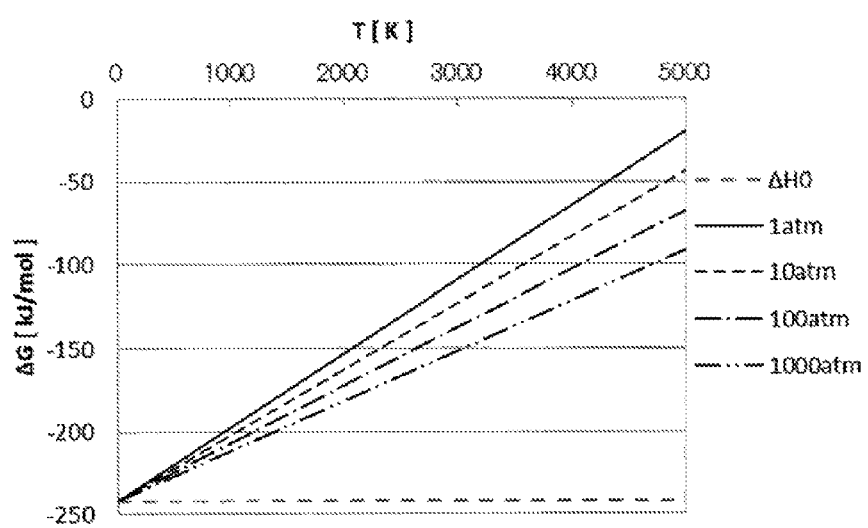
FIG. 17 is a graph illustrating an influence of a pressure to be exerted by free energy, the influence being obtained by thermodynamic calculation.

In the instance where hydrogen is converted into electric energy in a fuel cell, heat ($T\Delta S$) occupies 17% of chemical energy $\Delta H$ obtained from hydrogen. In order to decrease the amount of generated heat, electricity is generated by supplying high-pressure hydrogen to the fuel cell. Thus, it is possible to restrain the generation of heat and to enhance power generation efficiency. In the instance where hydrogen is produced from electric energy in the fuel cell, heat ($T\Delta S$) corresponding to 17% of the energy $\Delta H$ obtained from hydrogen is used. Herein, when hydrogen and oxygen are generated at atmospheric pressure, the work is done against an atmosphere, which leads to a loss. For this reason, electrolysis is performed in a sealed space. Thus, the used heat $T\Delta S$ can be made smaller than 17% of the energy $\Delta H$. FIG. 17 illustrates results of thermodynamic calculation. This figure indicates that as a pressure becomes larger, the heat $T\Delta S$ becomes smaller.

In this fuel cell, oxygen and hydrogen obtained by applying electrolysis to the electrolyte are stored and utilized under high pressure without return to atmospheric pressure. Thus, it is possible to realize high power generation efficiency η.

Moreover, a potential V is proportional to free energy ΔG. That is, a relation of V=ΔG/FM is established (here, F; Faraday coefficient, M; molecular weight). More specifically, as the potential V becomes larger, the free energy ΔG becomes larger and the power generation efficiency η is also enhanced. As illustrated in FIG. 16, this fuel cell is kept at the almost always high potential, and maintains the high power generation efficiency η.

A terminal voltage per one fuel cell at the time of open circuit falls within a range from 0.8 to 1.48 V. When the discharge of the positive electrode is continued, manganese oxyhydroxide occupies almost the entire composition, and the pressure of the electrolyte is 0.1 MPa, then, the terminal voltage becomes 0.8 V. When the charge of the positive electrode is continued, manganese dioxide occupies almost the entire composition, and the pressure of the electrolyte exceeds 10 MPa and more over, the terminal voltage becomes 1.48 V.

INDUSTRIAL APPLICABILITY

This fuel cell can be suitably used as an industrial power storage apparatus and a consumer power storage apparatus.

REFERENCE SIGN LIST

1 Negative electrode case
2 Positive electrode case
3 Electrolyte
4 Negative electrode
5 Separator
6 Positive electrode
7 Oxygen storage chamber
8 Hydrogen storage chamber
9 Wall member
10 Outer casing
11 Negative electrode terminal
13 Electrolyte
14 Negative electrode
15 Separator
16 Positive electrode
17 Insulating member
18 Hydrogen storage chamber
19 Oxygen storage chamber
25 Current collector plate
26 Coolant passage
27 Air fan
28 Hydrogen circulation port 28
29 Conduit 29
30 Cooler 30
31 Hydrogen source 31
32 Oxygen circulation port 32
33 Conduit 33
34 Cooler 34
35 Pump
36 Electrolyte storage source
37 Stirrer
38 Oxygen source
100 Outer jacket
101 Body part
102 Bulging part
103 Gasket
110 Positive electrode
120 Negative electrode
121 Hydrogen gas storage source
130 Separator
134 Current collector
135 Partition
136a, 136b Oxygen storage chamber
137 Electrolyte
138 Hydrogen storage chamber
211, 212 Flange
220, 221, 222 Conduit
230 Salt concentration adjusting apparatus
233 Reverse osmosis membrane
250 Oxygen concentration adjusting apparatus
251 Oxygen storage source
260 Cooler
270 Pump
300 Outer casing
301 Round pipe
302 Lid member
310 Current collector
311 Nut
320 Positive electrode
321 Notch
330 Negative electrode
331 Clearance
340 Separator
351, 352, 353 PP gasket
365 Electrolyte inlet
361 Electrolyte supply source
363 Electrolyte adjusting chamber
364 Release passage
366 Electrolyte outlet
371 Hydrogen gas storage source
372 Hydrogen gas storage passage
373 Hydrogen gas supply port
380 Hydrogen storage chamber

The invention claimed is:
1. A reversible fuel cell comprising:
a positive electrode containing manganese dioxide;
a negative electrode containing a hydrogen storage material;
a separator disposed between the positive electrode and the negative electrode;
an electrolyte,
a hydrogen storage chamber for storing hydrogen generated from the negative electrode by electrolysis of the electrolyte; and
an oxygen storage chamber for storing oxygen generated from the positive electrode by the electrolysis of the electrolyte;
wherein the oxygen is the oxygen dissolved in the electrolyte; and
wherein 95% to 100% volume of the oxygen storage chamber is filled with the electrolyte.
2. The reversible fuel cell according to claim 1, wherein an amount of oxygen dissolving in the electrolyte is 0.02 to 24 g/L.
3. The reversible fuel cell according to claim 1, wherein a pressure of the electrolyte is 0.2 MPa to 278 MPa.
4. The reversible fuel cell according to claim 1, wherein each of the positive electrode and the negative electrode is an electrode for power generation and is also an electrode for electrolysis of the electrolyte using electric current fed from the outside.

5. The reversible fuel cell according to claim 1, wherein the oxygen storage chamber and the hydrogen storage chamber are separated from each other by a movable member or a flexible member.

6. The reversible fuel cell according to claim 1, wherein
in a tubular outer casing, the negative electrode formed into a tube shape is disposed with a radial space interposed between the negative electrode and the tubular case, the positive electrode formed into a tube shape is disposed inside the negative electrode with the separator interposed between the positive electrode and the negative electrode, the hydrogen storage chamber is formed in the radial space, and the oxygen storage chamber is formed inward the positive electrode, or
in a tubular outer casing, the positive electrode formed into a tube shape is disposed with a radial space interposed between the positive electrode and the tubular case, the negative electrode formed into a tube shape is disposed inside the positive electrode with the separator interposed between the negative electrode and the positive electrode, the oxygen storage chamber is formed in the radial space, and the hydrogen storage chamber is formed inward the negative electrode.

7. A reversible fuel cell comprising:
a positive electrode containing manganese dioxide;
a negative electrode containing a hydrogen storage material;
a separator disposed between the positive electrode and the negative electrode;
an electrolyte,
a hydrogen storage chamber for storing hydrogen generated from the negative electrode by electrolysis of the electrolyte; and
an oxygen storage chamber for storing oxygen generated from the positive electrode by the electrolysis of the electrolyte,
wherein the oxygen is the oxygen dissolved in the electrolyte, and
wherein in a tubular outer casing, the negative electrode formed into a tube shape is disposed with a radial space interposed between the negative electrode and the tubular case, the positive electrode formed into a tube shape is disposed inside the negative electrode with the separator interposed between the positive electrode and the negative electrode, the hydrogen storage chamber is formed in the radial space, and the oxygen storage chamber is formed inward the positive electrode, or
in a tubular outer casing, the positive electrode formed into a tube shape is disposed with a radial space interposed between the positive electrode and the tubular case, the negative electrode formed into a tube shape is disposed inside the positive electrode with the separator interposed between the negative electrode and the positive electrode, the oxygen storage chamber is formed in the radial space, and the hydrogen storage chamber is formed inward the negative electrode,
the reversible fuel cell further comprising:
a negative electrode terminal provided on one axial end of the outer casing and electrically connected to the negative electrode;
a positive electrode terminal provided on the other axial end of the outer casing and electrically connected to the positive electrode;
a projection provided on one of the positive electrode terminal and the negative electrode terminal; and
a recess provided on the other one of the positive electrode terminal and the negative electrode terminal, wherein
the projection can be fitted into the recess such that two reversible fuel cells are connected in series.

8. A reversible fuel cell module comprising a plurality of cell units connected in series, wherein
each of the cell units includes:
a plurality of reversible fuel cells according to claim 7; and
a pair of current collector plates provided to be opposed to each other such that the plurality of reversible fuel cells is sandwiched therebetween, and
the positive electrode terminal is connected to one of the current collector plates and the negative electrode terminal is connected to the other current collector plate, so that the reversible fuel cells are connected in parallel with the current collector plate.

9. A reversible fuel cell comprising:
a positive electrode containing manganese dioxide;
a negative electrode containing a hydrogen storage material;
a separator disposed between the positive electrode and the negative electrode;
an electrolyte,
a hydrogen storage chamber for storing hydrogen generated from the negative electrode by electrolysis of the electrolyte; and
an oxygen storage chamber for storing oxygen generated from the positive electrode by the electrolysis of the electrolyte;
wherein the oxygen is the oxygen dissolved in the electrolyte,
the reversible fuel cell further comprising:
an outer jacket including a tubular body part, and bulging parts provided on openings formed at two ends of the body part to bulge outward the openings and cover the openings;
the oxygen storage chambers formed in inward spaces of the bulging parts in the outer jacket; and
a tubular current collector housed in the outer jacket in an axial direction and having two ends opened at the oxygen storage chambers, wherein
the positive electrode is disposed on an outer periphery of the current collector,
the separator covers around the positive electrode,
the hydrogen storage chamber is formed between the separator and the outer jacket,
the negative electrode is filled in the hydrogen storage chamber, and
the electrolyte is stored in the oxygen storage chambers and can be flown between the oxygen storage chambers through the current collector.

10. A reversible fuel cell comprising:
a positive electrode containing manganese dioxide;
a negative electrode containing a hydrogen storage material;
a separator disposed between the positive electrode and the negative electrode;
an electrolyte,
a hydrogen storage chamber for storing hydrogen generated from the negative electrode by electrolysis of the electrolyte; and
an oxygen storage chamber for storing oxygen generated from the positive electrode by the electrolysis of the electrolyte;

wherein the oxygen is the oxygen dissolved in the electrolyte, the reversible fuel cell further comprising:

an outer casing including a tubular body part; and a rod-shaped current collector passing through the positive electrode, the negative electrode and the separator, wherein the positive electrode, the negative electrode and the separator are stacked in an axial direction of the body part and are housed in the outer casing, the positive electrode has a notch to be formed by cutting a part of an outer periphery thereof, and the outer periphery of the positive electrode is in contact with an inner surface of the body part except the notch, the positive electrode is not in contact with the current collector, the negative electrode has a U-shaped section opened in an inner circumferential direction and is in contact with the current collector, a space surrounded with the negative electrode and the current collector forms the hydrogen storage chamber, an outer dimension of the negative electrode is smaller than an inner dimension of the body part, and an electrolyte reservoir is provided between the negative electrode and the body part to communicate with the notch, and the oxygen storage chamber includes the notch and the electrolyte reservoir.

11. A reversible fuel cell system comprising:

a reversible fuel cell according to claim 6; and an oxygen storage source and a hydrogen storage source each connected to the fuel cell, wherein the oxygen storage source can supply oxygen dissolving in the electrolyte to the reversible fuel cell, and can store oxygen generated from the reversible fuel cell in a state that the oxygen dissolves in the electrolyte, and the hydrogen gas storage source can supply hydrogen gas to the reversible fuel cell and can store hydrogen gas generated from the reversible fuel cell.

12. A reversible fuel cell system comprising:

a reversible fuel cell;

the reversible fuel cell comprising:

a positive electrode containing manganese dioxide;

a negative electrode containing a hydrogen storage material;

a separator disposed between the positive electrode and the negative electrode;

an electrolyte, a hydrogen storage chamber for storing hydrogen generated from the negative electrode by electrolysis of the electrolyte; and an oxygen storage chamber for storing oxygen generated from the positive electrode by the electrolysis of the electrolyte;

wherein the oxygen is the oxygen dissolved in the electrolyte, and wherein in a tubular outer casing, the negative electrode formed into a tube shape is disposed with a radial space interposed between the negative electrode and the tubular case, the positive electrode formed into a tube shape is disposed inside the negative electrode with the separator interposed between the positive electrode and the negative electrode, the hydrogen storage chamber is formed in the radial space, and the oxygen storage chamber is formed inward the positive electrode, or in a tubular outer casing, the positive electrode formed into a tube shape is disposed with a radial space interposed between the positive electrode and the tubular case, the negative electrode formed into a tube shape is disposed inside the positive electrode with the separator interposed between the negative electrode and the positive electrode, the oxygen storage chamber is formed in the radial space, and the hydrogen storage chamber is formed inward the negative electrode, the reversible fuel cell further comprising a salt concentration adjusting apparatus connected to the reversible fuel cell to remove water contained in the electrolyte; and an oxygen concentration adjusting apparatus connected to the reversible fuel cell to supply oxygen to the electrolyte, thereby adjusting a dissolved oxygen concentration.

13. The reversible fuel cell according to claim 1, wherein the manganese dioxide serves as a catalyst for a charge reaction in the positive electrode, and the hydrogen storage material serves as a catalyst for a charge reaction in the negative electrode.

14. The reversible fuel cell according to claim 1, wherein the positive electrode contains, in addition to manganese dioxide, higher manganese oxide.

15. The reversible fuel cell according to claim 1, wherein a content of trimanganese tetraoxide ($Mn_3O_4$) in the positive electrode is not more than 5% by weight relative to a weight of the positive electrode.

16. The reversible fuel cell according to claim 1, wherein the manganese dioxide contained in the positive electrode is subjected to carbon coating.

17. The reversible fuel cell according to claim 1, wherein the hydrogen storage material contains a hydrogen storage alloy or at least one kind of metal selected from the group consisting of Sc, Ti, V, Cr, Mn, Fe, Co and Ni.

18. The reversible fuel cell according to claim 1, wherein in the negative electrode, a surface being in contact with the separator contains a hydrophilic material, and a surface being in contact with the hydrogen storage chamber contains a hydrophobic material.

19. The reversible fuel cell according to claim 1, wherein the oxygen storage chamber has an inner surface coated with nickel or chromium.

* * * * *